(12) United States Patent
Greener et al.

(10) Patent No.: US 7,713,595 B2
(45) Date of Patent: May 11, 2010

(54) OPTICAL COMPENSATION FILMS PRODUCED BY A CARRIER-WEB-CASTING PROCESS

(75) Inventors: Jehuda Greener, Rochester, NY (US); James F. Elman, Fairport, NY (US); Jon A. Hammerschmidt, Rochester, NY (US); Elizabeth K. Priebe, Rochester, NY (US)

(73) Assignee: Nitto Denko Corporation, Ibaraki-Shi, Osaka (JP)

(*) Notice: Subject to any disclaimer, the term of this patent is extended or adjusted under 35 U.S.C. 154(b) by 1148 days.

(21) Appl. No.: 11/254,109

(22) Filed: Oct. 18, 2005

(65) Prior Publication Data

US 2007/0087132 A1 Apr. 19, 2007

(51) Int. Cl.
*C09K 19/00* (2006.01)
*G02F 1/1333* (2006.01)
*G02F 1/1335* (2006.01)

(52) U.S. Cl. .............. 428/1.1; 428/1.2; 428/1.3; 430/20; 349/84; 349/117; 349/118; 349/119

(58) Field of Classification Search ........... 428/1.1–1.3; 349/84, 117–119; 430/20
See application file for complete search history.

(56) References Cited

U.S. PATENT DOCUMENTS

| | | | |
|---|---|---|---|
| 5,256,357 A | 10/1993 | Hayward | |
| 5,695,694 A | 12/1997 | Iwata et al. | |
| 6,108,058 A | 8/2000 | Uchida | |
| 6,184,957 B1 | 2/2001 | Mori et al. | |
| 7,083,835 B2 * | 8/2006 | Elman et al. | 428/1.3 |
| 7,163,724 B2 * | 1/2007 | Elman et al. | 428/1.3 |
| 7,211,304 B2 * | 5/2007 | Elman et al. | 428/1.3 |
| 2001/0026338 A1 | 10/2001 | Aminaka | |
| 2003/0086033 A1 | 5/2003 | Sasaki et al. | |
| 2004/0021814 A1 | 2/2004 | Elman et al. | |
| 2005/0024561 A1 | 2/2005 | Elman et al. | |
| 2006/0072221 A1 | 4/2006 | Nishikouji et al. | |
| 2006/0153998 A1 | 7/2006 | Greener et al. | |

FOREIGN PATENT DOCUMENTS

| | | |
|---|---|---|
| EP | 544013 A1 | 3/1996 |
| JP | 1999-95208 | 4/1999 |
| JP | 2002-210766 | 7/2002 |
| WO | WO 2005/012962 A1 | 2/2005 |
| WO | WO 2005/066705 A1 | 7/2005 |
| WO | WO 2007/002050 A1 | 1/2007 |

OTHER PUBLICATIONS

J. Greener et. al.; "Optical Properties of Solvent-Cast Polarizer Films for Liquid Crystal Display: A Viscoelastic Modeling Framework", SID 05 Digest, Jul. 29, 2004, pp. 756-759.
International Search Report PCT/US2006/038673 mailed Apr. 13, 2007.

* cited by examiner

*Primary Examiner*—Geraldina Visconti
(74) *Attorney, Agent, or Firm*—Westerman, Hattori, Daniels & Adrian, LLP

(57) ABSTRACT

A method of forming an optical compensation film includes coating one or more first layers and one or more second layers onto a carrier substrate, and stretching the first layers and second layers simultaneously. The one or more first layers include a polymer having an out-of-plane birefringence ($\Delta n_{th}$) not more negative than −0.005 and not more positive than +0.005, and the one or more second layers include a polymer having an out-of-plane birefringence more negative than −0.005 or more positive than +0.005. The overall in-plane retardation ($R_{in}$) of the optical compensation film is greater than 20 nm and the out-of-plane retardation ($R_{th}$) of the optical compensation film is more negative than −20 nm or more positive than +20 nm.

34 Claims, 13 Drawing Sheets

OFF

ON

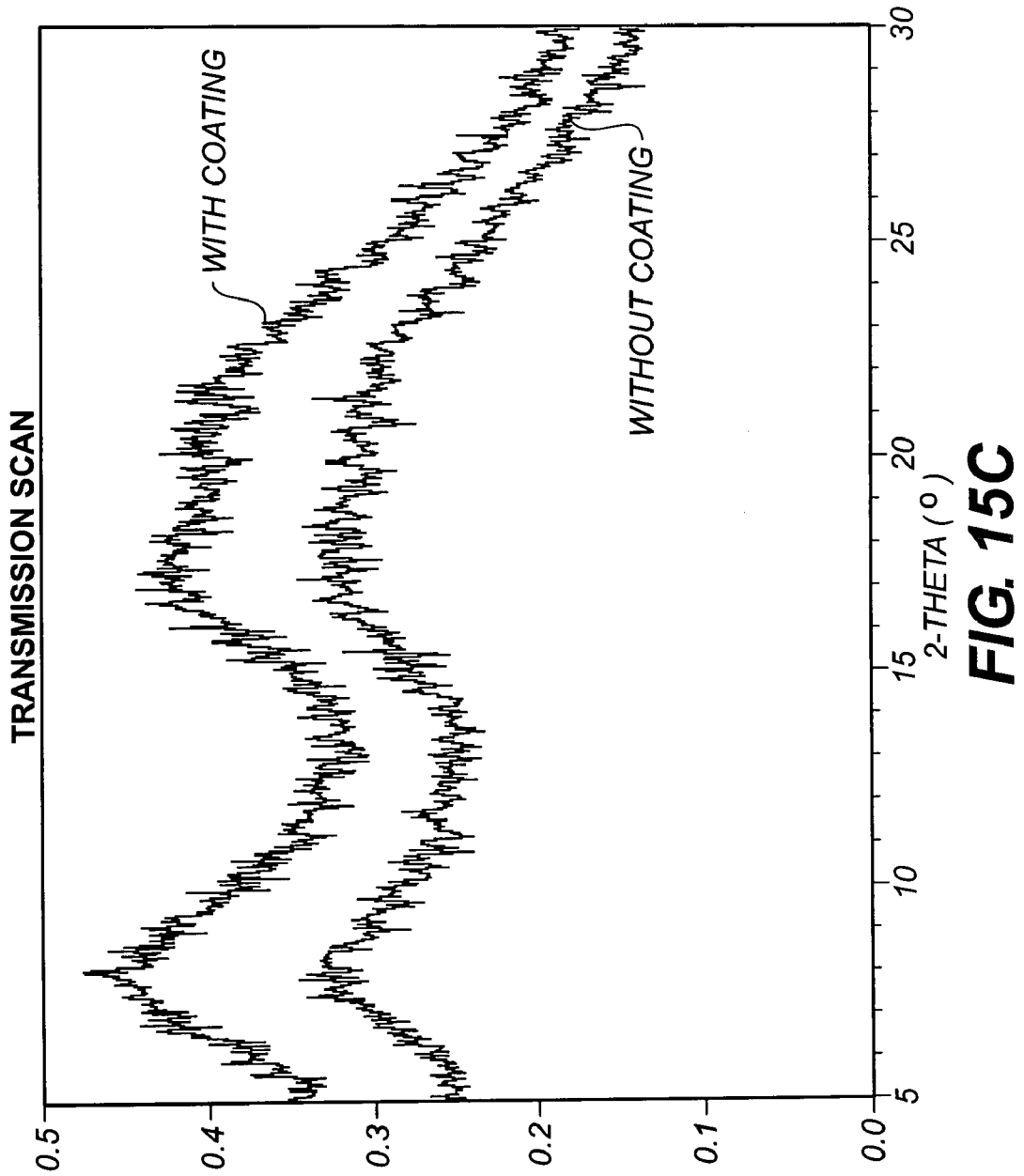

OPTICAL COMPENSATION FILMS PRODUCED BY A CARRIER-WEB-CASTING PROCESS

FIELD OF THE INVENTION

The present invention relates to an optical compensator, for example for liquid crystal displays. The invention also relates to a process for making such an optical compensator.

BACKGROUND OF THE INVENTION

Liquid crystals are widely used for electronic displays. In these display systems, a liquid crystal cell is typically situated between a polarizer and an analyzer. An incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, and electronic games for which light-weight, low-power consumption and long-operating life are important features.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the direction from which the display screen is viewed ("viewing angle"). Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

LCDs are quickly replacing CRTs as monitors for desktop computers and other office or household appliances. It is also expected that the number of LCD television monitors with a larger screen size will sharply increase in the near future. However, unless problems of viewing angle dependence such as hue shift, degradation in contrast, and an inversion of brightness are solved, the LCD's application as a replacement of the traditional CRT will be limited.

A Vertically-Aligned liquid crystal display (VA-LCD) offers an extremely high contrast ratio for normal incident light. FIG. 10A and FIG. 10B are the schematics of a VA liquid crystal cell in OFF 1001 and ON 1003 states. In its OFF state, the liquid crystal optic axis 1005 is almost perpendicular to the substrate 1007, FIG. 10A. With an applied voltage, the optic axis 1005 is tilted away from the cell normal, FIG. 10B. In the OFF state, light in the normal direction 1009 does not see the birefringence of the liquid crystal layer, yielding a dark state that is close to that of orthogonally crossed polarizers. However, obliquely propagated light 1011 picks up retardation from the liquid crystal layer, producing light leakage. This results in a poor contrast ratio in some viewing angle range.

A bend aligned nematic liquid crystal display, also referred as an Optically Compensated Bend Liquid Crystal Display (OCB-LCD) uses a nematic liquid crystal cell based on the symmetric bend state. In its actual operation, the brightness of the display using the bend aligned nematic liquid crystal cell is controlled by an applied voltage or field that leads to a different degree in the bend orientation within the cell as shown in FIG. 11A (OFF) 1101 and FIG. 11B (ON) 1103. In both states, the liquid crystal optic axis 1105 takes on a symmetric bend state around the cell middle plane 1107. In the ON state, the optic axis becomes substantially perpendicular to the cell plane except near the cell substrates 1109. OCB mode offers faster response speed that is suitable to the liquid crystal display television (LCD-TV) application. It also has advantages in viewing angle characteristic (VAC) over conventional displays, such as Twisted Nematic liquid crystal display (TN-LCD)

The above-mentioned two modes, due to their superiority over the conventional TN-LCD, are expected to dominate the high-end applications such as LCD-TV. However, practical applications of both OCB-LCDs and VA-LCDs require optical compensating means to optimize the VAC. In both modes, due to the birefringence of liquid crystal and the crossed polarizers, the VAC suffers deterioration in contrast when the displays are viewed from oblique angles. The use of biaxial films has been suggested to compensate the OCB (U.S. Pat No. 6,108,058) and VA (JP1999-95208) LCDs. In both modes, liquid crystals align sufficiently perpendicular to the plane of the cell in ON (OCB) or OFF (VA) states. This state gives positive out-of-plane retardation, $R_{th}$, thus the compensation films have to have sufficiently large negative $R_{th}$ for satisfactory optical compensation. The need for a biaxial film with a large $R_{th}$ is also common for Super Twisted Nematic Liquid Crystal Display (STN-LCD).

Another promising type of LCD is the in-plane switching mode LCD. In the VA-LCD and OCB-LCD devices discussed above the electrodes are disposed on opposite sides of the LC layer, that is, on the opposing substrates. In contrast, in an in-plane switching mode LCD, electrodes are disposed on a same side of the LC layer, that is, on a same substrate. However, in order to improve oblique angle contrast, an in-plane switching device needs an optical compensator with a sufficiently large positive out-of-plane retardation $R_{th}$. In particular, multilayer compensators where the ($R_{th}$) of the multilayer compensator is more positive than +20 nm would be useful in compensating in-plane switching (IPS) mode LCD's.

Several methods of manufacturing biaxial films with a sufficient negative value of $R_{th}$ suitable for compensating LCD modes such as OCB, VA and STN have been suggested.

Sasaki et al. proposes (US2003/0086033) the use of cholesteric liquid crystal disposed on a positively birefringent thermoplastic substrate. The pitch of the cholesteric liquid crystal (CHLC) is shorter than the wavelength of the visible light, thus properly aligned CHLC exhibits form birefringence giving negative $R_{th}$. $R_{in}$ is controlled by adjusting the stretching amount of the thermoplastic substrate. The method enables one to adjust $R_{th}$ and $R_{in}$ separately. However, the use of short pitch CHLC not only makes the manufacturing cost high but also complicates the processing due to the alignment procedure.

Wada et al. (EP09544013A1) disclose an optical compensator including an optically compensating film that is laminated to an optically isotropic film using, for example, a urethane adhesive. Wada teach that only certain polymers are suitable for their optically compensating film, and in particular, teach that certain common, inexpensive materials such as polycarbonate and polystyrene should not be used.

US 2001/0026338 discloses the use of a retardation-increasing agent in combination with triacetylcellulose (TAC). The retardation-increasing agent is chosen from aromatic compounds having at least two benzene rings. By stretching the agent-doped-TAC, one can generate both $R_{th}$ and in-plane retardation, $R_{in}$. However, one problem with this method is the amount of the doping agent required. To generate the desired effects of increasing $R_{th}$ and $R_{in}$, the necessary amount of agent can be high enough to cause unwanted coloration, or movement (diffusion) of the agent into other layers in the LCD with a resulting loss of $R_{th}$ and $R_{in}$ and undesired chemistry in these adjacent layers. Also, with this method it is difficult to control the values of $R_{th}$ and $R_{in}$ independently.

JP2002-210766 discloses the use of propionyl or butyryl substituted TAC. They show higher birefringence than ordinary TAC. Thus, by biaxially stretching the substituted TAC film, one can generate $R_{in}$ and $R_{th}$. The method does not require any additional coating or layer, but it suffers from a difficulty of independent control of $R_{in}$ and $R_{th}$.

Moreover, the TAC based structures described above suffer from other disadvantages. For one thing, the TAC film must have a thickness greater than at least 40 μm, as it is very difficult to reliably fabricate films that are much thinner than that by the casting methods typically employed, due to the fragility of wet film during the peeling and drying process. In practice, the TAC film will typically have a thickness of at least 80 μm to provide adequate structural stability. Meanwhile however, as the demand increases for thinner and thinner displays, it becomes necessary to produce thinner optical compensation films.

Another drawback to the casting method of forming TAC base structures is the inability to accurately apply multiple layers. As noted in U.S. Pat. No. 5,256,357 to Hayward, conventional multi-slot casting dies create unacceptably non-uniform films. In particular, line and streak non-uniformity is greater than 5% with prior art devices. Acceptable two layer films may be prepared by employing special die lip designs as taught in U.S. Pat. No. 5,256,357 to Hayward, but the die designs are complex and may be impractical for applying more than two layers simultaneously.

Yet another drawback to the casting method is the restrictions on the viscosity of the dope. In casting practice, the viscosity of dope is on the order of 50,000 cp. For example, U.S. Pat. No. 5,256,357 to Hayward describes practical casting examples using dopes with a viscosity of 100,000 cp. In general, cast films prepared with lower viscosity dopes are known to produce non-uniform films as noted for example in U.S. Pat. No. 5,695,694 to Iwata. In U.S. Pat. No. 5,695,694 to Iwata, the lowest viscosity dopes used to prepare casting samples are approximately 10,000 cp. At these high viscosity values, however, casting dopes are difficult to filter and degas. While fibers and larger debris may be removed, softer materials such as polymer slugs are more difficult to filter at the high pressures found in dope delivery systems. Particulate and bubble artifacts create conspicuous inclusion defects as well as streaks and may create substantial waste.

In addition, the casting method can be relatively inflexible with respect to product changes. Because casting requires high viscosity dopes, changing product formulations requires extensive down time for cleaning delivery systems to eliminate the possibility of contamination. Particularly problematic are formulation changes involving incompatible polymers and solvents. In fact, formulation changes are so time consuming and expensive with the casting method that most production machines are dedicated exclusively to producing only one film type.

Cast films also may exhibit undesirable cockle or wrinkles. Thinner films are especially vulnerable to dimensional artifacts either during the peeling and drying steps of the casting process or during subsequent handling of the film. In particular, the preparation of polarizer plates from resin films requires a lamination process involving application of adhesives, pressure, and high temperatures. Very thin films are difficult to handle during this lamination process without wrinkling. In addition, many cast films may naturally become distorted over time due to the effects of moisture. For optical films, good dimensional stability is necessary during storage as well as during subsequent fabrication of polarizer plates.

Thus, it would be desirable to provide an optical compensator with independently controlled $R_{th}$ and $R_{in}$ that can be readily and inexpensively manufactured. It would also be desirable to provide an optical compensator capable of a greater range of in-plane retardance, $R_{in}$. It would further be desirable to provide a thinner optical compensator, and a method of producing a thinner optical compensator. It would be still further desirable to provide a method of producing an optical compensator that mitigates one or more of the disadvantages of the traditional casting processes as described above.

SUMMARY OF THE INVENTION

In one aspect of the invention, a multilayer optical compensation film composite comprises: a carrier substrate; and a multilayer optical compensation film attached to the carrier substrate, the multilayer optical compensation film including, one or more first layers, and one or more second layers. The first layers comprise a polymer having an out-of-plane birefringence not more negative than −0.005 and not more positive than +0.005. The second layers comprise a polymer having an out-of-plane birefringence more negative than −0.005 or more positive than +0.005. The overall magnitude of the in-plane retardation ($R_{in}$) of the multilayer optical compensation film is greater than 20 nm and the out-of-plane retardation ($R_{th}$) of the multilayer optical compensation film is more negative than −20 nm or more positive than +20 nm.

In another aspect of the invention, an optical compensation film composite comprises: a carrier substrate; and one or more polymeric layers. The polymeric layers comprise a polymer having an out-of-plane birefringence more negative than −0.005 or more positive than +0.005. The overall magnitude of the in-plane retardation ($R_{in}$) of the one or more polymeric layers is greater than 20 nm and the out-of-plane retardation ($R_{th}$) of the one or more polymeric layers is more negative than −20 nm or more positive than +20 nm.

In yet another aspect of the invention, a method of forming a multilayer optical compensation film comprises: coating one or more first layers and one or more second layers onto a carrier substrate; and stretching the first layers and second layers simultaneously. One or more first layers include a polymer having an out-of-plane birefringence ($\Delta n_{th}$) not more negative than −0.005 and not more positive than +0.005. One or more second layers include a polymer having an out-of-plane birefringence more negative than −0.005 or more positive than +0.005. The overall in-plane retardation ($R_{in}$) of the multilayer optical compensation film is greater than 20 nm and the out-of-plane retardation ($R_{th}$) of the multilayer optical compensation film is more negative than −20 nm or more positive than +20 nm.

In still another aspect of the invention, a method of forming an optical compensation film comprises: coating one or more polymeric layers onto a carrier substrate; and stretching the one or more polymeric layers simultaneously. One or more polymeric layers include a polymer having an out-of-plane birefringence more negative than −0.005 or more positive than +0.005. The overall in-plane retardation ($R_{in}$) of the one or more polymeric layers is greater than 20 nm and the out-of-plane retardation ($R_{th}$) of the one or more polymeric layers is more negative than −20 nm or more positive than +20 nm.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 15C illustrates X-ray diffraction data of a stretched TAC layer alone (without coating) and a stretched tri-layer structure (with coating) of a TAC layer coated with polymers.

DETAILED DESCRIPTION OF THE INVENTION

The following definitions apply to the description herein:

Optic axis refers to the direction in which propagating light does not see birefringence.

ON and OFF state refers to the state with and without applied voltage to the liquid crystal cell.

Figure 9:
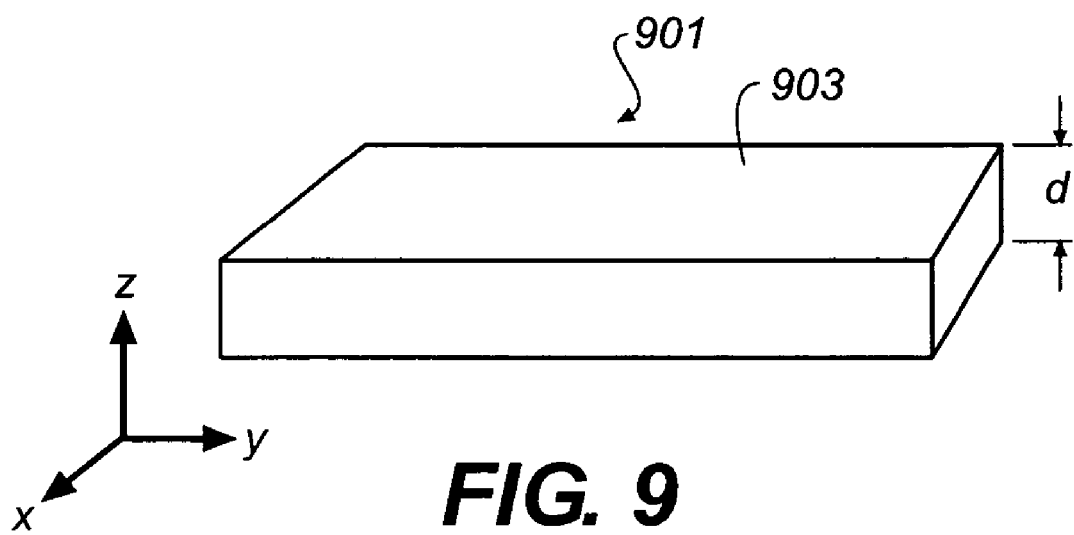
FIG. 9 is a view of a typical layer with thickness d and x-y-z coordinate system attached to the layer.
Figure 10A:
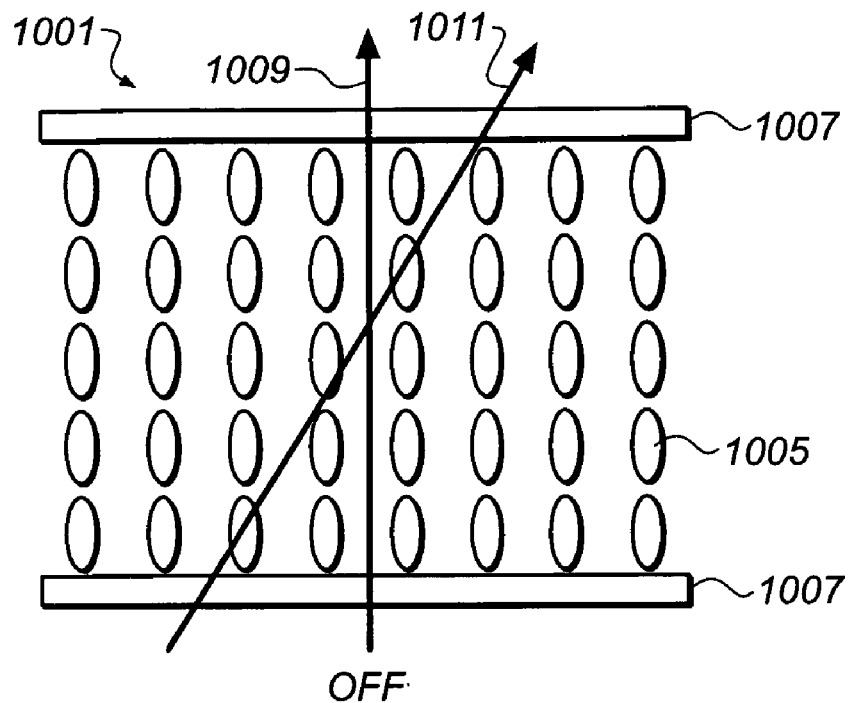
FIG. 10A and FIG. 10B are schematics showing, respectively, the typical ON and OFF state of the VA liquid crystal cell.
Figure 10B:
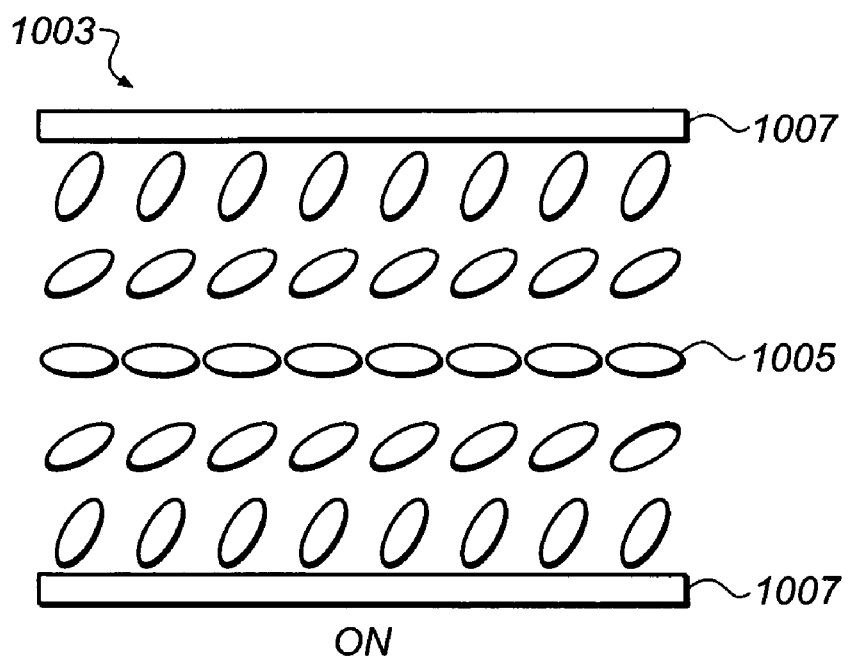

In-plane retardation, $R_{in}$, of a layer 901 shown in FIG. 9 is a quantity defined by $(nx-ny)d$, where nx and ny are indices of refraction in the direction of x and y. The x axis is taken as a direction of maximum index of refraction in the x-y plane and the y direction is perpendicular to the x axis. Thus $R_{in}$ will always be a positive quantity. The x-y plane is parallel to the plane 903 of the layer, and d is a thickness of the layer in the z-direction. The quantity $(nx-ny)$ is referred to as in-plane birefringence, $\Delta n_{in}$. It also will always have positive values. The values of $\Delta n_{in}$ and $R_{in}$ hereafter are given at wavelength $\lambda=590$ nm.

Out of-plane retardation, $R_{th}$, of a layer 901 shown in FIG. 9, herein, is a quantity defined by $[nz-(nx+ny)/2]d$. nz is the index of refraction in z-direction. The quantity $[nz-(nx+ny)/2]$ is referred to as out-of-plane birefringence, $\Delta n_{th}$. If $nz>(nx+ny)/2$, $\Delta n_{th}$ is positive, thus the corresponding $R_{th}$ is also positive. If $nz<(nx+ny)/2$, $\Delta n_{th}$ is negative and $R_{th}$ is also negative. The values of $\Delta n_{th}$ and $R_{th}$ hereafter are given at $\lambda=590$ nm.

Figure 15A:
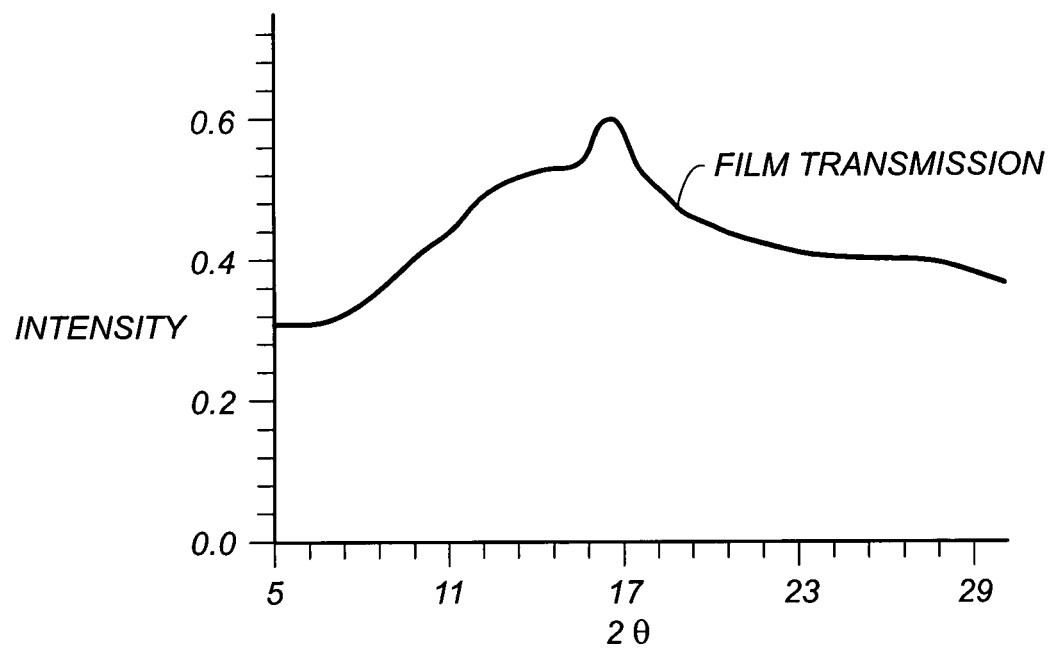
FIG. 15A illustrates a wide-angle X-ray diffraction pattern for the transmission mode of a highly ordered, non-amorphous material.
Figure 15B:
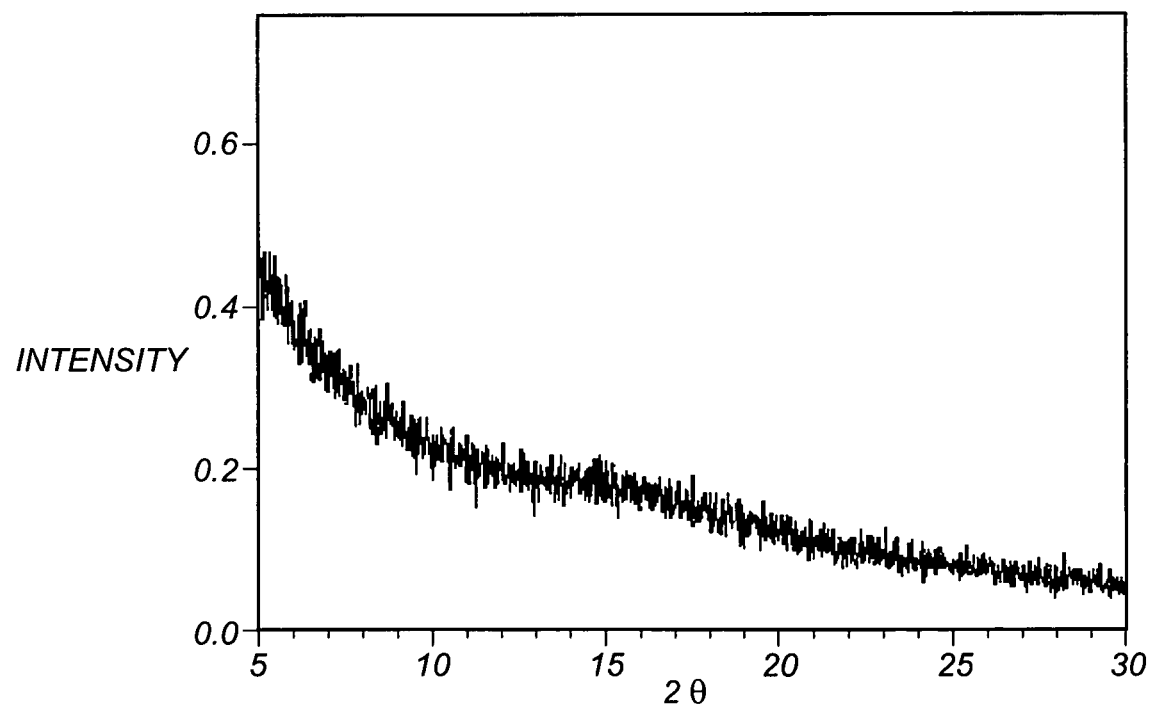
FIG. 15B is a wide-angle X-ray diffraction pattern for the transmission mode of an amorphous polymer material.

Amorphous means a lack of molecular order. Thus an amorphous polymer does not show molecular order as measured by techniques such as X-ray diffraction. This is demonstrated, by example only, by the contrasting graphic characteristics illustrated in FIGS. 15A and 15B. FIG. 15A illustrates a wide-angle X-ray diffraction pattern (transmission mode) of a rigid rod polymer, specifically a $(BPDA-TFNB)_{0.5}-(PMDA-TFMB)_{0.5}$ polyimide as referenced in U.S. Pat. No. 5,344,916. FIG. 15B is a wide-angle X-ray diffraction pattern (transmission mode) of an amorphous polymer [poly(4,4'-hexafluoroisopropylidene-bisphenol-co-4,4'-(2-norbornylidene)bisphenol)terephthalate-co-isophthalate].

In FIG. 15A one observes the sharp X-ray peaks present at $2\theta=17°$ as shown in FIG. 15A. These sharp peaks are indicators of distinct molecular order, which thus defines such polymers as not being amorphous. The non-amorphous state illustrated in FIG. 15A is appropriately described in U.S. Pat. No. 5,344,916 as being a "rigid rod". Other non-amorphous states would include the liquid crystal state and the three dimensional crystalline state.

In contrast, in FIG. 15B one does not observe any sharp peaks, like that of FIG. 15A. One does see in FIG. 15B a slight rise in the background. This is the so-called "amorphous halo" which is a universal feature in the X-ray diffraction patterns of all amorphous materials. Even liquid water will produce an "amorphous halo." The intensity of the "amorphous halo" observed in an X-ray diffraction pattern will depend upon the thickness of the sample.

FIG. 15C illustrates X-ray diffraction data of a stretched TAC layer alone (just a first layer "without coating") and a stretched tri-layer structure (two first layers and one second layer, "with coating") of a TAC layer coated with amorphous polymers. It can be seen that the polymer coating introduces no peaks in the data, thus evidencing the amorphous structure of the polymer coating.

Chromophore means an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these groups.

Non-visible chromophore means a chromophore that has an absorption maximum outside the range of 400-700 nm.

Contiguous means that articles are in contact with each other. In two contiguous layers, one layer is in direct contact with the other. Thus, if a polymer layer is formed on the substrate by coating, the substrate and the polymer layers are contiguous.

Uniaxial means that two of the three indices of refraction, nx, ny, and nz, are essentially the same.

Biaxial means that the three indices of refraction, nx, ny, and nz, are all different.

Commonly assigned U.S. patent application Ser. No. 10/631,152, filed 31 Jul. 2003, is incorporated herein by reference. In that application, a multilayer optical compensator is disclosed in which at least one embodiment thereof is characterized by the provision of an amorphous polymer coated onto the surface of a previously stretched polymer support layer. The support layer is stretched to generate an in-plane retardation that is greater than 20 nm.

Meanwhile, commonly assigned U.S. patent application Ser. No. 10/858,670, filed 3 Jun. 2004, is also incorporated herein by reference. In that application, multilayer optical compensators are disclosed at least partially characterized by simultaneous stretching of both (or all) layers of the multilayer optical compensation film after the amorphous polymer layer has been coated onto the surface of the polymer support. The stretching can take place while the film is in a "wet" state, i.e., after co-casting (or coating) of the layers and prior to (or concurrently with) drying of the amorphous polymer. Alternately, or in addition, "dry" stretching can occur after the multilayer optical compensation film has been cast and the amorphous polymer dried.

In various liquid crystal displays, it is desirable to modify the birefringence of polarizer stack layers, to optimize the viewing angle for the complete screen system.

The manufacturing methods described herein, in combination with specific polymers, produce a multilayer optical compensation film comprising one or more first layers having very little out-of-plane birefringence (e.g., triacetylcellulose (TAC)) to be combined with one or more second layers of polymer to form a multilayer optical compensator. The thickness of the TAC and the second layer polymer can be varied to provide a "tunable" package of optical properties. In some cases, the manufacturing method may allow the one or more first layer (e.g., TAC) to be omitted entirely.

It has been found by the inventors that stretching of an already dried multilayer optical compensation film can produce desirable amounts of in-plane anisotropy. As used herein, the term "machine direction" means a direction coincident with a casting or coating direction of the film Stretching can occur in the machine direction. Alternately, or in addition, stretching can occur in a direction perpendicular to the machine direction, which is referred to as the transverse direction. Stretching in both the machine and transverse directions can be done sequentially or simultaneously. Also alternatively, or in addition, stretching can occur obliquely relative to the transverse direction (i.e. in a diagonal fashion). In particular, by stretching an already dried multilayer optical compensation film it is possible to produce high in-plane retardation values. In dry-stretching, stresses applied to the sheet after manufacturing can control the in-plane (x,y) retardation and the thickness and properties of the second layer polymer can control the out-of-plane retardation. This application of polymers can result in a simple way to create a useful sheet in a cost effective manner.

Optical compensators where the out-of-plane retardation ($R_{th}$) of the multilayer compensator is more negative than −20 nm would be useful in compensating vertically aligned (VA) mode LCD's. Optical compensators where the out-of-plane retardation ($R_{th}$) is more positive than +20 nm would be useful in compensating in-plane switching (IPS) mode LCD's.

Accordingly, disclosed herein are a class of optical compensators where the $R_{th}$ of the optical compensator can be substantially negative (e.g., more negative than −20 nm), or substantially positive (e.g., more positive than +20 nm).

Figure 1:
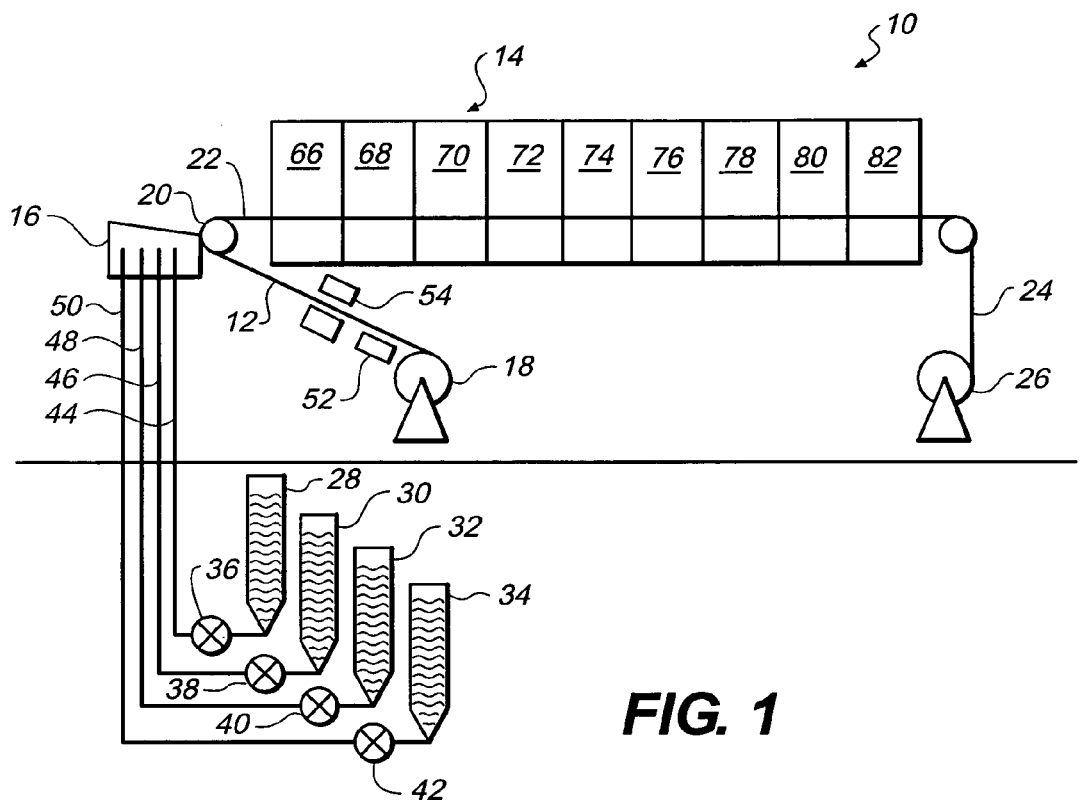
FIG. 1 is a schematic of an exemplary coating and drying apparatus that can be used in the manufacture of an optical compensation film.

Turning now to FIG. 1 there is shown a schematic of an exemplary coating and drying system 10 suitable for preparing the multilayer optical compensation film composites disclosed herein. The coating and drying system 10 is typically used to apply very thin films to a moving carrier substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying apparatus 10 includes an unwinding station 18 to feed the moving substrate 12 around a back-up roller 20 where the coating is applied by coating apparatus 16. The coated substrate 22 then proceeds through the dryer 14. Beneficially, the final multilayer optical compensation film composite 24 comprising a multilayer optical compensation film on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 2:
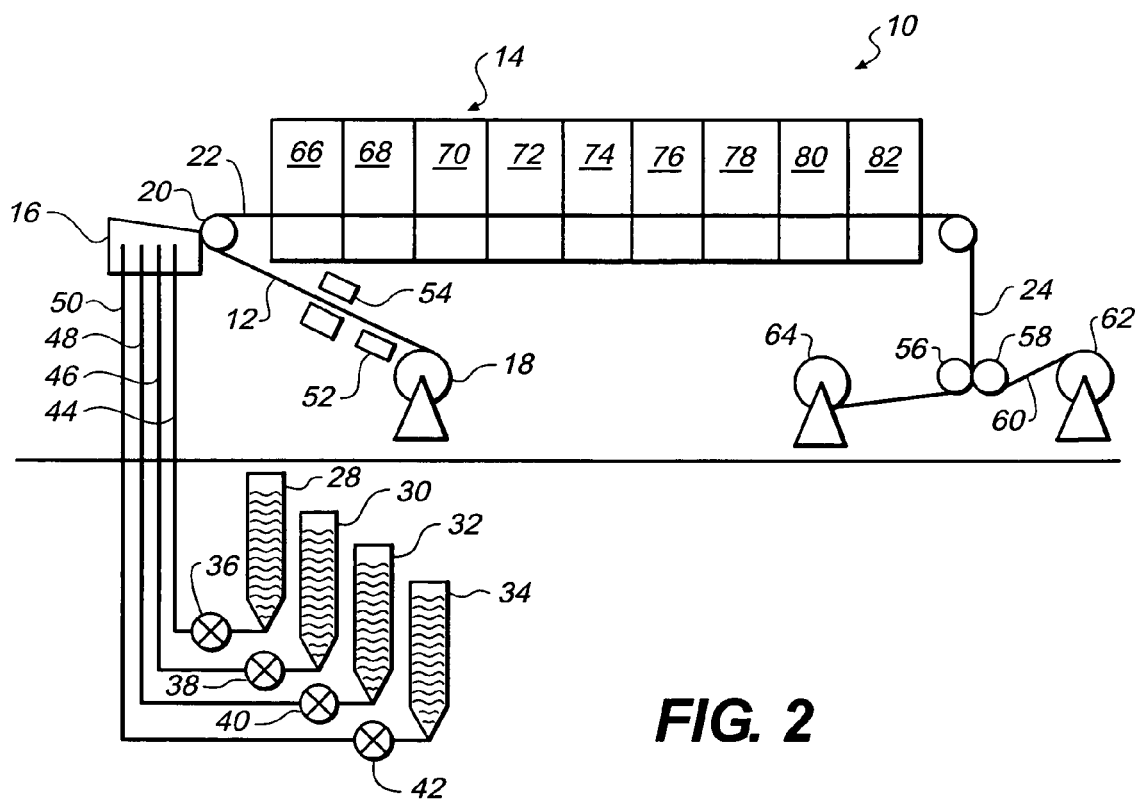
FIG. 2 is a schematic of an exemplary coating and drying apparatus of FIG. 1 including a station where the cellulose acetate web separated from the substrate is separately wound.

Turning next to FIG. 2, there is shown a schematic of the same exemplary coating and drying system 10 depicted in FIG. 1 with an alternative winding operation to apply a strippable protection layer. Accordingly, the drawings are numbered identically up to the winding operation. In practice, the multilayer optical compensation film composite 24 comprising a carrier substrate (which may be a resin film, paper, resin coated paper or metal) with a multilayer optical compensation film applied thereto is taken between opposing nip rollers 56, 58. The multilayer optical compensation film composite 24 is adhesively adhered or electrostatically adhered to a preformed strippable protection layer 60 which is supplied from unwind station 62 and the multilayer optical compensation film composite containing the strippable protection layer is wound into rolls at wind-up station 64. In a preferred embodiment, polyolefin or polyethylene phthalate (PET) is used as the preformed, strippable protection layer 60. Either the multilayer optical compensation film/carrier substrate composite 24, or the protection layer 60, may be pretreated with an electric charge generator to enhance the electrostatic attraction of the protection layer 60 to the multilayer optical compensation film/carrier substrate composite 24.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as slot die bead hopper or jet hopper. In a preferred embodiment, the application device 16 is a multi-layer slide bead hopper.

As mentioned above, coating and drying system 10 includes a dryer 14 that will typically be a drying oven to remove solvent from the coated film. An exemplary dryer 14 includes a first drying section 66 followed by eight additional drying sections 68-82 capable of independent control of temperature and air flow. Although dryer 14 is shown as having nine independent drying sections, drying ovens with fewer compartments are well known and may be used to practice the process described herein. In a preferred embodiment the dryer 14 has at least two independent drying zones or sections.

Preferably, each of drying sections 68-82 each has independent temperature and airflow controls. In each section, temperature may be adjusted between 5° C. and 150° C. To minimize drying defects from case hardening or skinning-over of the wet layers, optimum drying rates are needed in the early sections of dryer 14. There are a number of artifacts created when temperatures in the early drying zones are inappropriate. For example, fogging or blush of cellulose acetate films is observed when the temperature in zones 66, 68 and 70 are set at 25° C. This blush defect is particularly problematic when high vapor pressures solvents (methylene chloride and acetone) are used in the coating fluids. Aggressively high temperatures of 95° C. in the early drying sections 66, 68, and 70 are found to cause premature delamination of the multilayer optical compensation film from the carrier substrate. Higher temperatures in the early drying sections are also associated with other artifacts such as case hardening, reticulation patterns and blistering of the multilayer optical compensation film. In preferred embodiment, the first drying section 66 is operated at a temperature of at least about 25° C. but less than 95° C. with no direct air impingement on the wet coating of the coated web 22. In another preferred embodiment, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 may optimize empirically within these ranges by those skilled in the art.

Figure 3:
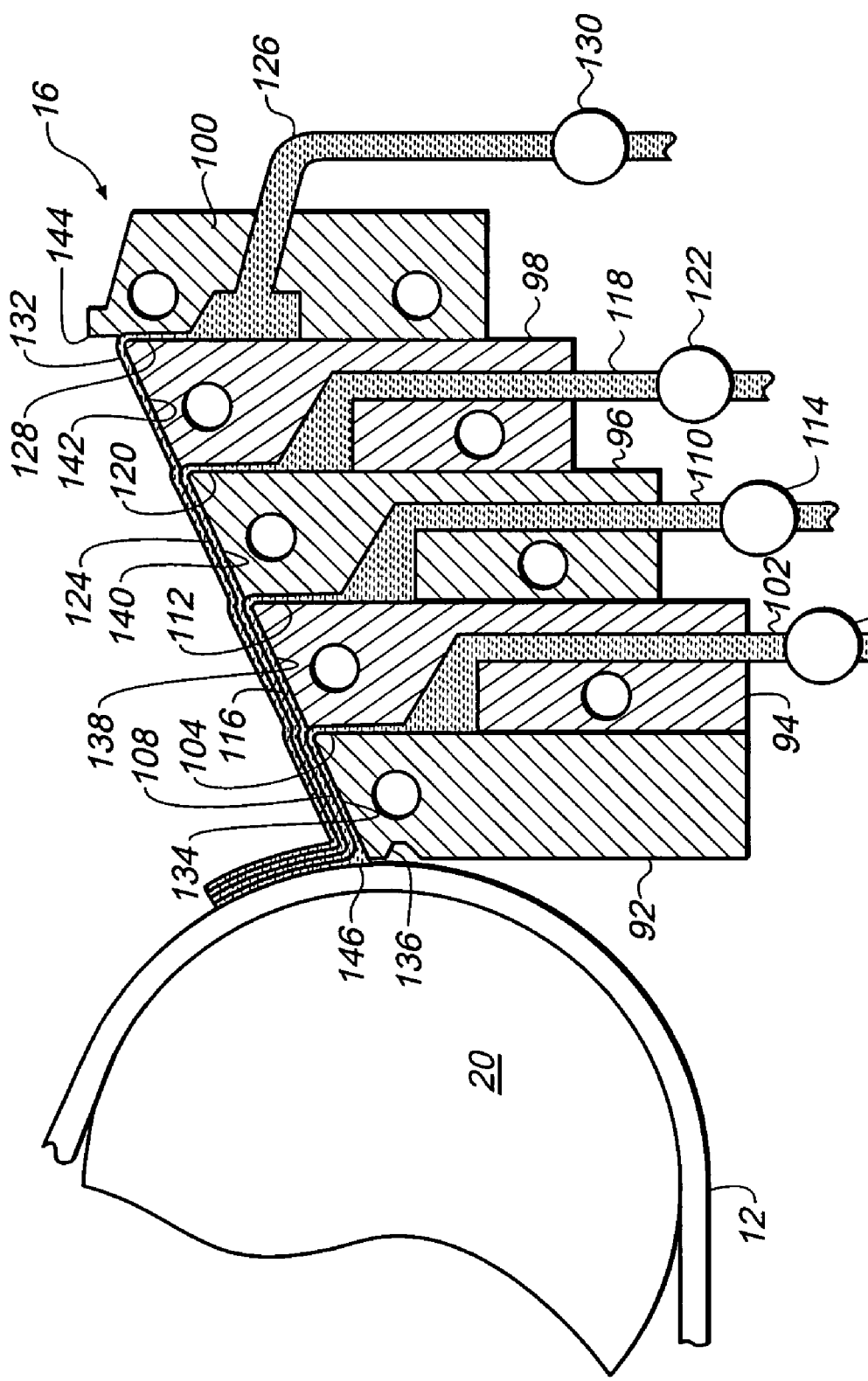
FIG. 3 is a schematic of an exemplary multi-slot coating apparatus that can be used in the manufacture of an optical compensation film.

Referring now to FIG. 3, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 in back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating backing roller 20 about which a web 12 is conveyed. Coating layers 108, 116, 124, 132 form a multilayer composite which forms a coating bead 146 between lip 136 and substrate 12. Typically, the coating hopper 16 is movable from a non-coating position toward the coating backing roller 20 and into a coating position. Although coating apparatus 16 is shown as having four metering slots, coating dies having a larger number of metering slots (as many as nine or more) are well known and may be used to practice the method disclosed herein.

Beneficially, the coating fluids are comprised principally of a polymer binder dissolved in an organic solvent. In a particularly preferred embodiment, the low birefringence polymer film is a cellulose ester. These are commercially available in a variety of molecular weights as well as in the type and degree of alkyl substitution of the hydroxyl groups on the cellulose backbone. Examples of cellulose esters include those having acetyl, propionyl and butyryl groups. Of particular interest is the family of cellulose esters with acetyl substitution known as cellulose acetate. Of these, the fully acetyl substituted cellulose having a combined acetic acid content of approximately 58.0-62.5% is known as triacetyl cellulose (TAC) and is generally preferred for preparing multilayer optical compensators used in electronic displays.

In terms of organic solvents for TAC, suitable solvents, for example, include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, TAC solutions are prepared with a blend of the aforementioned solvents. Preferred primary solvents include methylene chloride, acetone, methyl acetate, and 1,3-dioxolane. Preferred co-solvents for use with the primary solvents include methanol, ethanol, n-butanol and water.

Coating formulations may also contain plasticizers. Appropriate plasticizers for TAC films include phthalate esters (dimethylphthalate, dimethoxyethyl phthalate, diethylphthalate, dibutylphthalate, dioctylphthalate, didecylphthalate and butyl octylphthalate), adipate esters (dioctyl adipate), and phosphate esters (tricresyl phosphate, biphenylyl diphenyl phosphate, cresyl diphenyl phosphate, octyl diphenyl phosphate, trioctyl phosphate, tributyl phosphate, and triphenyl phosphate), glycolic acid esters (triacetin, tributyrin, butyl phthalyl butyl glycolate, ethyl phthalyl ethyl glycolate, and methyl phthalyl ethyl glycolate). Plasticizers are normally used to improve the physical and mechanical properties of the final film. In particular, plasticizers are known to improve the flexibility and dimensional stability of cellulose acetate films. However, plasticizers are also used here as coating aids in the converting operation to minimize premature film solidification at the coating hopper and to improve drying characteristics of the wet film. In the process described herein, plasticizers are used to minimize blistering, curl and delamination of TAC films during the drying operation. In a preferred embodiment, plasticizers are added to the coating fluid at a total concentration of up to 50% by weight relative to the concentration of polymer in order to mitigate defects in the final TAC film.

Coating formulations may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: 1.) Polydimethylsiloxanes such as DC200 Fluid from Dow Corning, 2.) Poly(dimethyl, methylphenyl)siloxanes such as DC510 Fluid from Dow Corning, and 3.) Polyalkyl substituted polydimethylsiloxanes such as DC190 and DC1248 from Dow Corning as well as the L7000 Silwet series (L7000, L7001, L7004 and L7230) from Union Carbide, and 4.) Polyalkyl substituted poly(dimethyl, methylphenyl)siloxanes such as SF1023 from General Electric. Examples of commercially available fluorochemical surfactants include: 1.) Fluorinated alkyl esters such as the Fluorad series (FC430 and FC431) from the 3M Corporation, 2.) Fluorinated polyoxyethylene ethers such as the Zonyl series (FSN, FSN100, FSO, FSO100) from Du Pont, 3.) Acrylate: polyperfluoroalkyl ethylacrylates such as the F series (F270 and F600) from NOF Corporation, and 4.) Perfluoroalkyl derivatives such as the Surflon series (S383, S393, and S8405) from the Asahi Glass Company. In the process described herein, surfactants are generally of the non-ionic type. In a preferred embodiment of the process described herein, non-ionic compounds of either the siloxane or fluorinated type are added to the uppermost layers.

In terms of surfactant distribution, surfactants are most effective when present in the uppermost layers of the multilayer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant into the lowermost layers. The concentration of surfactant in the second uppermost layer is preferably 0.000-0.200% by weight and most preferably between 0.000-0.100 % by weight. Because surfactants are only necessary in the uppermost layers, the overall amount of surfactant remaining in the final dried film is small. In the process described herein, a practical surfactant concentration in the uppermost layer having a wet thickness of 20 µm and a density of 0.93 g/cc is 0.200% by weight which after drying gives a final surfactant amount of approximately 37 mg/sq-m.

Although surfactants are not required to practice the process described herein, surfactants do improve the uniformity of the coated film. In particular, mottle nonuniformities are reduced by the use of surfactants. In transparent cellulose acetate films, mottle nonuniformities are not readily visualized during casual inspection. To visualize mottle artifacts, organic dyes may be added to the uppermost layer to add color to the coated film. For these dyed films, nonuniformities are easy to see and quantify. In this way, effective surfactant types and levels may be selected for optimum film uniformity. The preparation of the multilayer optical compensation film composites described herein may also include the step of coating over a previously prepared composite of low birefringence polymer film and carrier substrate. For example, the coating and drying system 10 shown in FIGS. 1 and 2 may be used to apply a second multi-layer film to an existing low birefringence polymer film/substrate composite. If the film/substrate composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick films may be prepared at high line speeds without the problems associated with the removal of large amounts of solvent from a very thick wet film. Moreover, the practice of multi-pass or tandem coating also has the advantage of minimizing other artifacts such as streak severity, mottle severity, and overall film nonuniformity.

Figure 14:
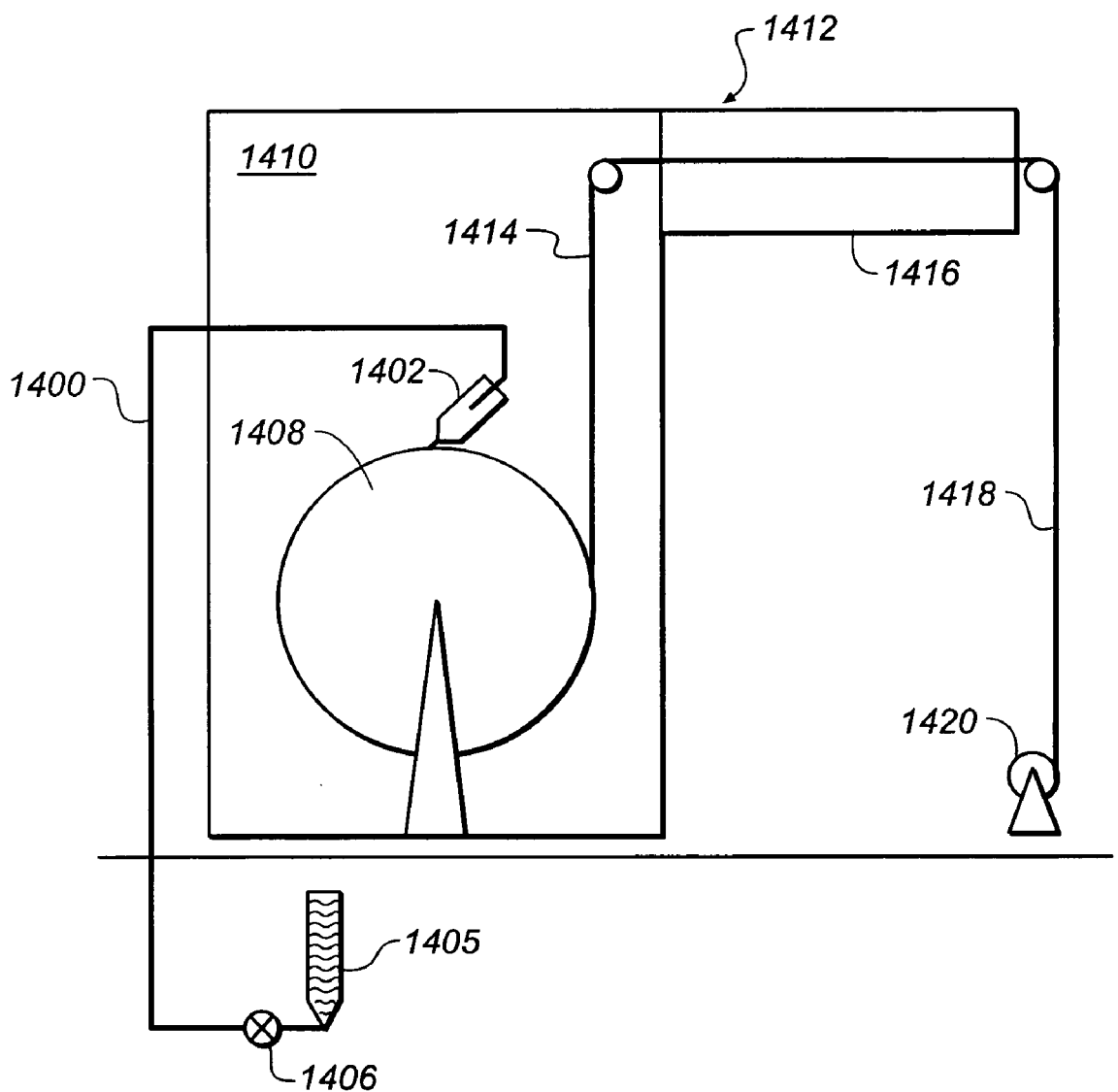
FIG. 14 is a schematic of a casting apparatus as used in the prior art to cast cellulose acetate films.

A prior art method of casting resin films is illustrated in FIG. 14. As shown in FIG. 14, a viscous polymeric dope is delivered through a feed line 1400 to an extrusion hopper 1402 from a pressurized tank 1404 by a pump 1406. The dope is cast onto a highly polished metal drum 1408 located within a first drying section 1410 of the drying oven 1412. The cast film 1414 is allowed to partially dry on the moving drum 1408 and is then peeled from the drum 1408. The cast film 1414 is then conveyed to a final drying section 216 to remove the remaining solvent. The final dried film 1418 is then wound into rolls at a wind-up station 1420. The prior art cast film typically has a thickness in the range of from 40 to 200 µm.

Figure 11A:
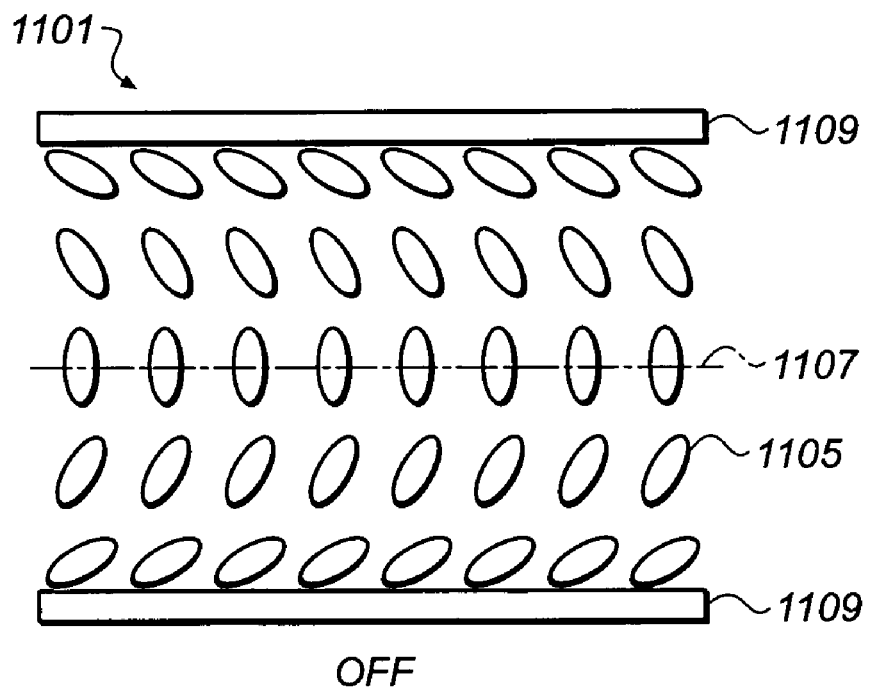
FIG. 11A and FIG. 11B are schematics showing, respectively, the typical ON and OFF states of the OCB liquid crystal cell.
Figure 11B:
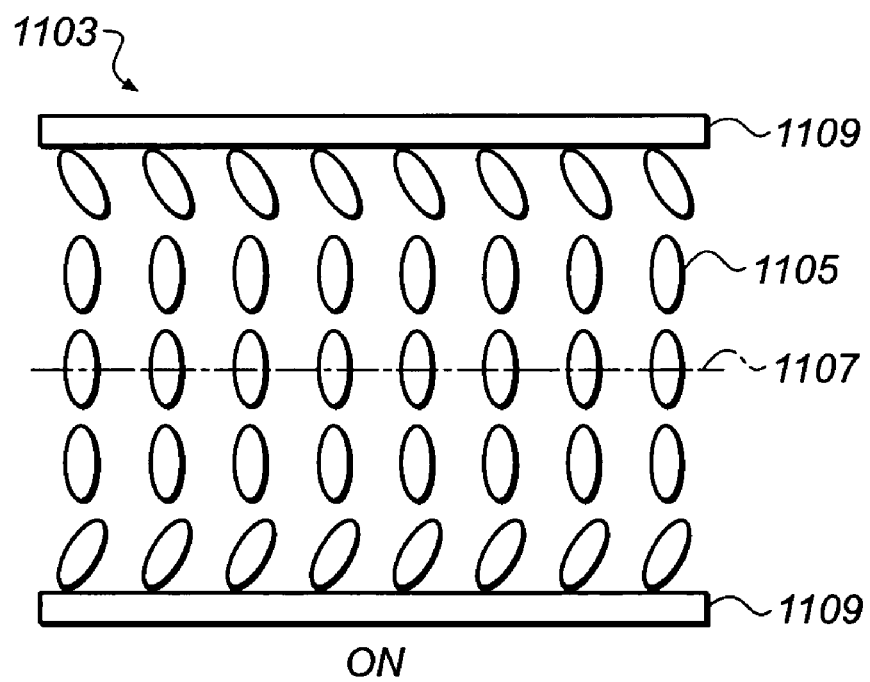

Coating methods are distinguished from casting methods by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried film/substrate composite into rolls. In contrast, casting methods involve applying a concentrated viscous dope to a highly polished metal drum or band, partially drying the wet film on the metal substrate, stripping the partially dried film from the substrate, removing additional solvent from the partially dried film in a drying oven, and winding the dried film into rolls. In terms of viscosity, coating methods require very low viscosity liquids of less than 5,000 cp. In the process described herein, the viscosity of the coated liquids will generally be less than 2000 cp and most often less than 1500 cp. Moreover, in the process described herein the viscosity of the lowermost layer is preferred to be less than 200 cp. and most preferably less than 100 cp. for high speed coating application. In contrast, casting methods require highly concentrated dopes with viscosity on the order of 10,000-100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping operation in casting methods. For example, n-butanol is sometimes used as a converting aid in casting TAC films to facilitate stripping of the TAC film from the metal drum. In terms of substrates, coating methods generally utilize thin (10-250 µm) flexible supports. In contrast, casting methods employ thick (1-100 mm), continuous, highly polished metal drums or rigid bands. As a result of these differences in process steps, the hardware used in coating is conspicuously different from those used in casting as can be seen by a comparison of the schematics shown in FIGS. 1 and 11, respectively.

Figure 4:
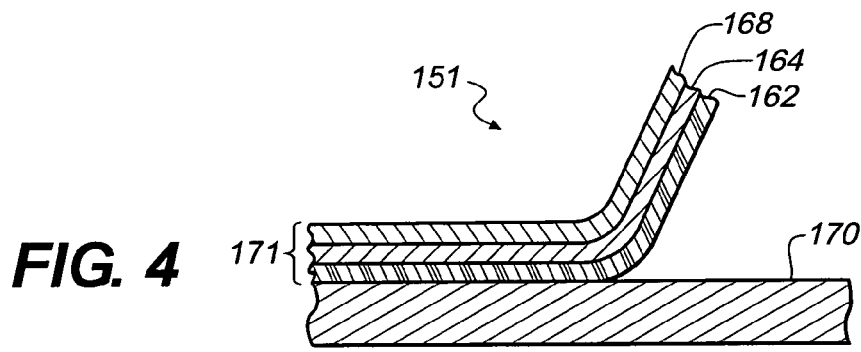
FIG. 4 shows a cross-sectional representation of a multi-layer optical compensation film comprising a three-layer optical compensation film and a partially peeled carrier substrate.

Turning next to FIGS. 4 through 8, there are presented cross-sectional illustrations showing various multilayer optical compensation film composite configurations possible with the process described herein. In FIG. 4, a multilayer optical compensation film composite 151 comprising a three-layer optical compensation film 171 having a first layer 162, a contiguous first layer 164, and a second layer 168 is shown partially peeled from a carrier substrate 170. In this illustration, layer 162 could be a low birefringence film (e.g., TAC), layer 164 could be a barrier layer, and layer 168 could be a polymer layer, for example, providing significant positive or negative out-of-plane birefringence (e.g., more negative than −0.005 or more positive than +0.005). Layers 162, 164, and 168 may be formed either by applying and drying three separate liquid layers on the carrier substrate 170 or by simultaneously applying a multiple layer composite coating and then drying the layers in a single drying operation.

Figure 5:
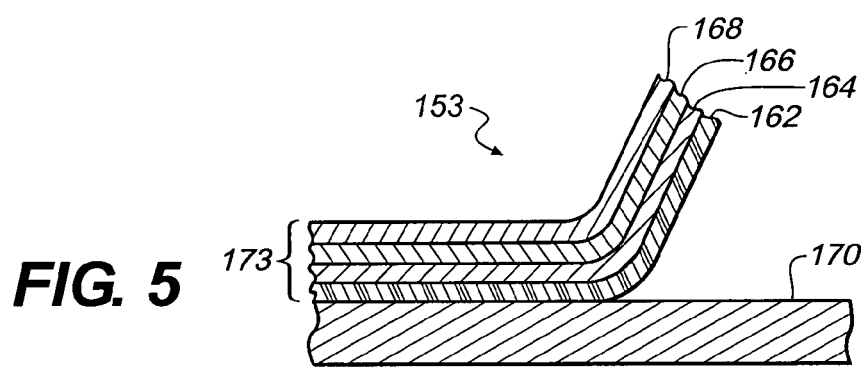
FIG. 5 shows a cross-sectional representation of a multi-layer optical compensation film composite comprising a four-layer optical compensation film and a partially peeled carrier substrate.

FIG. 5 illustrates another multilayer optical compensation film composite 153 comprising a multilayer optical compensation film 173 that is comprised of, for example, four compositionally discrete layers including a first layer 162 nearest to the carrier support 170, a contiguous first layer 164, and two second layers 166 and 168. FIG. 5 also shows that the entire multilayer optical compensation film 173 may be peeled from the carrier substrate 170. In this illustration, layer 162 could be a low birefringence polymer film (e.g., TAC), layer 164 could be a barrier layer, and layers 166 and 168 could each be a polymer comprising a second layer, for example, providing significant positive or negative out-of-plane birefringence (e.g., more negative than −0.005 or more positive than +0.005).

Figure 6:
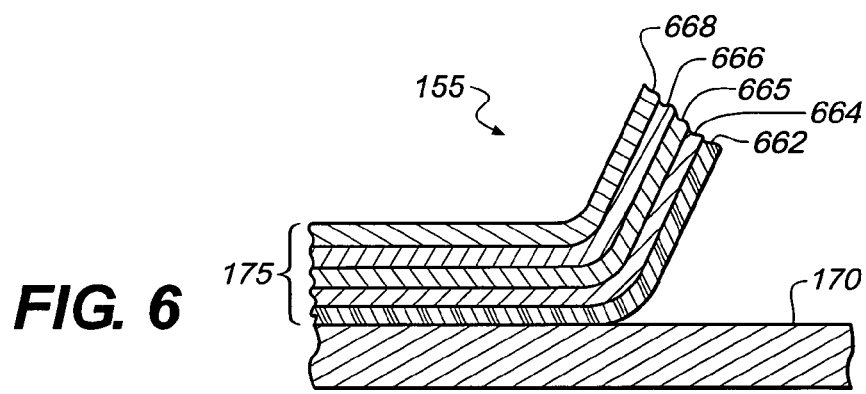
FIG. 6 shows a cross-sectional representation of a multi-layer optical compensations film composite comprising a five-layer optical compensation film and a partially peeled carrier substrate.

FIG. 6 shows another multilayer optical compensation film composite 155 comprising multilayer optical compensation film 175 that is comprised of a second layer 662 nearest to the carrier substrate 170, a contiguous first layer 664, a first layer 665, another contiguous first layer 666, and another second layer 668. FIG. 6 also shows that the entire multilayer optical compensation film 175 may be peeled from the carrier substrate 170. In this illustration, layer 665 could be a low birefringence polymer film (e.g., TAC), layers 664 and 666 could each be a barrier layer, and layers 662 and 668 could each be a polymer layer, for example, providing significant positive or negative out-of-plane birefringence (e.g., more negative than −0.005 or more positive than +0.005).

Figure 7:
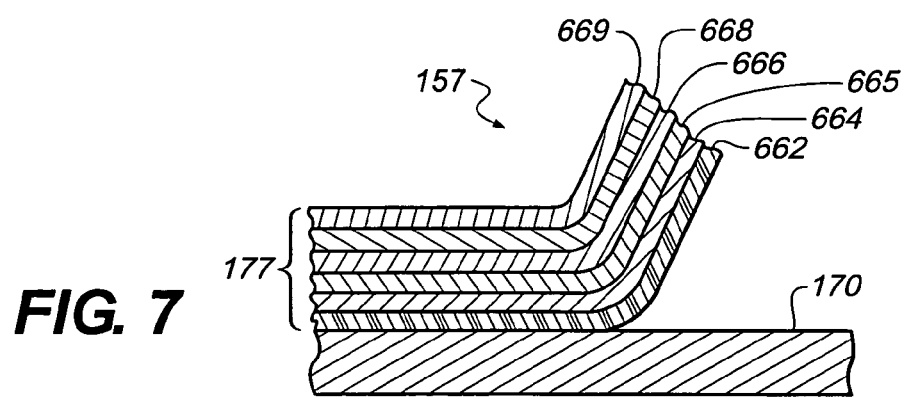
FIG. 7 shows a cross-sectional representation of a multi-layer optical compensation film comprising a four-layer optical compensation film, a strippable, protection layer and a partially peeled carrier substrate.

FIG. 7 shows yet another multilayer optical compensation film composite 157 comprising multilayer optical compensation film 177 that is comprised of a second layer 662 nearest to the carrier substrate 170, a contiguous first layer 664, a first layer 665, another contiguous first layer 666, and another second layer 668, and strippable protection layer 669 that is adhesively adhered to the second layer 668 by pressure sensitive adhesive layer (not shown separately). The multilayer optical compensation film 177 with strippable protection layer 669 is being peeled from the carrier substrate 170.

The structure of an LCD device may include a liquid crystal cell, one or more polarizer plates, and one or more light management films. Polarizer plates are typically a multi-layer element of resin films and are comprised of a polarizing film sandwiched between two protective cover sheets. Polarizing films are normally prepared from a transparent and highly uniform amorphous resin film that is subsequently stretched to orient the polymer molecules and stained with a dye to produce a dichroic film. An example of a suitable resin for the formation of polarizer films is fully hydrolyzed polyvinyl alcohol (PVA). Because the stretched PVA films used to form polarizers are very fragile and dimensionally unstable, protective cover sheets are normally laminated to both sides of the PVA film to offer both support and abrasion resistance.

Accordingly, one or more embodiments of the multilayer optical compensation film composite described herein may be a cover sheet as for a polarizing film for an LCD device. The cover sheet normally requires a surface treatment to insure good adhesion to the PVA dichroic film. When TAC is used as the protective cover film of a polarizer plate, the TAC film may be subjected to treatment in an alkali bath to saponify the TAC surface to provide suitable adhesion to the PVA dichroic film. The alkali treatment uses an aqueous solution containing a hydroxide of an alkali metal, such as sodium hydroxide or potassium hydroxide. After alkali treatment, the cellulose acetate film is typically washed with weak acid solution followed by rinsing with water and drying. This saponification process is both messy and time consuming. U.S. Pat. No. 2,362,580 describes a laminar structure wherein two cellulose ester films each having a surface layer containing cellulose nitrate and a modified PVA is adhered to both sides of a PVA film. JP 06094915A discloses a protective film for polarizer plates wherein the protective film has a hydrophilic layer which provides adhesion to PVA film.

Alternatively and advantageously, the multilayer optical compensation film composite serving as a polarization film cover sheet may include a layer promoting adhesion to PVA as a distinct layer that is applied in a coating step either separate from or simultaneous with the application of the low birefringence polymer film. The layer promoting adhesion to PVA provides acceptable adhesion of the cover sheet to a PVA dichroic film (in a liquid crystal display application) without the need for a wet pretreatment, such as saponification, of the cover sheet prior to lamination to the PVA film.

Figure 8:
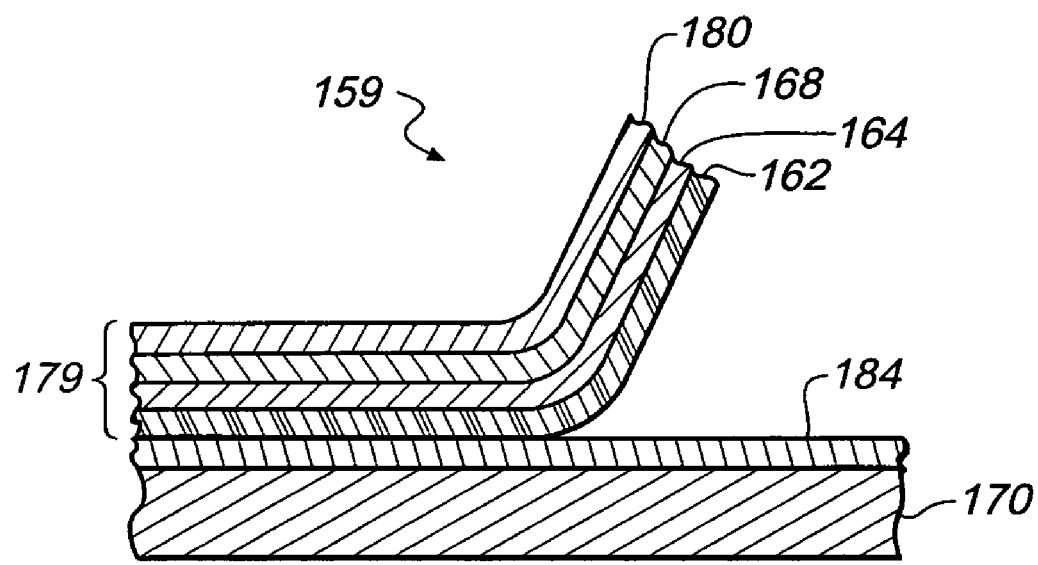
FIG. 8 shows a cross-sectional representation of a multi-layer optical compensation film comprising a three-layer optical compensation film having a polyvinyl alcohol (PVA) adhesion layer and a partially peeled carrier substrate wherein the carrier substrate has a release layer formed thereon.

FIG. 8 illustrates a multilayer optical compensation film composite 159 adapted to serve as a cover sheet for a polarizer. The multilayer optical compensation film composite 159 of FIG. 8 comprises a layer 180 promoting adhesion to PVA and a multilayer optical compensation film 179. The multilayer optical compensation film 179 includes, for example, three compositionally discrete layers including a first layer 162, a contiguous first layer 164, and a second layer 168. In this illustration, layer 162 could be a low birefringence polymer film (e.g., TAC), layer 164 could be a barrier layer, and layer 168 could each be a polymer layer, for example, providing significant positive or negative out-of-plane birefringence (e.g., more negative than −0.005 or more positive than +0.005). The carrier substrate 170 has been treated with a release layer 184 to modify the adhesion between the first layer 162 and substrate 170. Release layer 184 may be comprised of a number of polymeric materials such as polyvinylbutyrals, cellulosics, polyacrylates, polycarbonates and poly (acrylonitrile-co-vinylidene chloride-co-acrylic acid). The choice of materials used in the release layer may be optimized empirically by those skilled in the art.

Materials useful for forming the layer promoting adhesion to PVA are typically water-swellable, hydrophilic polymers which include both synthetic and natural polymers. Naturally occurring substances include proteins, protein derivatives, cellulose derivatives (e.g. cellulose esters), polysaccharides, casein, and the like, and synthetic polymers include poly (vinyl lactams), acrylamide polymers, polyvinyl alcohol and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl sulfonic acid copolymers, vinyl imidazole copolymers, vinyl sulfide copolymers, homopolymer or copolymers containing styrene sulfonic acid, and the like. The most preferred polymers are polyvinyl alcohol and its derivatives.

Other suitable polymers useful in the layer promoting adhesion to PVA include water dispersible polymers or polymer latexes. Preferably these water dispersible polymers contain at least one hydrophilic moiety, which includes hydroxyl, carboxyl, amino, or sulfonyl moieties. Such polymers include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. Other suitable polymer dispersions are polyurethane dispersions or polyesterionomer dispersions, polyurethane/vinyl polymer dispersions, fluoropolymer dispersions. These polymer dispersions have a particle size in the range of from 10 nanometers to 1 micron.

The layer promoting adhesion to PVA may also contain a crosslinking agent. Crosslinking agents useful in such a case include any compounds that are capable of reacting with the hydrophilic moieties attached to the polymer binder. Such crosslinking agents include aldehydes and related compounds, pyridiniums, olefins such as bis(vinylsulfonyl methyl) ether, carbodiimides, epoxides, triazines, polyfunctional aziridines, methoxyalkyl melamines, polyisocyanates, and the like. These compounds can be readily prepared using the published synthetic procedure or routine modifications that would be readily apparent to one skilled in the art of synthetic organic chemistry. Additional crosslinking agents that may also be successfully employed in the layer promoting adhesion to PVA include multivalent metal ion such as zinc, calcium, zirconium and titanium.

The layer promoting adhesion to PVA may also be an optically clear, pressure sensitive adhesive layer. A wide variety of these pressure sensitive adhesives are available. Adhesive materials useful for laminating the cover sheet to the PVA dichroic film can be selected from the general class of "modified acrylics" that have good adhesion, are transparent, and are inert with respect to chemical and UV aging and yellowing. Useful high strength adhesives, for example, are aqueous-based adhesives such as AEROSET® 2177 or AEROSET® 2550, 3240, and 3250 which are commercially available from Ashland Chemical Co., PD 0681, AP 6903, and W 3320 available from H. B. Fuller, or solvent-based pressure sensitive adhesives such as PS 508 sold by Ashland Chemical Co. The adhesives may be used separately or in combination.

The layer promoting adhesion to PVA is typically applied at a dried coating thickness of 0.1 to 5 micrometers, preferably 0.25 to 1 micrometers. The layer promoting adhesion to PVA may be on either side of the cover sheet relative to the low birefringence film. Preferably, the layer promoting adhesion to PVA is between the carrier substrate and the low birefringence film. Most preferably, the layer promoting adhesion to PVA is applied directly onto the carrier substrate or onto a subbing layer on the carrier substrate. The layer promoting adhesion to PVA may be coated in a separate coating application or it may be applied simultaneously with one or more other layers.

Beneficially, when the multilayer optical compensation film composite 159 is employed for a cover sheet for a PVA dichroic (polarizing) film, the cover sheet is laminated to the PVA dichroic film such that the layer promoting adhesion to PVA is on the side of the cover sheet that contacts the PVA dichroic film. The glue solution useful for laminating the cover film and the PVA dichroic film is not particularly limited, a commonly employed example is a water/alcohol solution containing a dissolved polymer such as PVA or its derivatives and a boron compound such as boric acid. Alternatively, the solution may be free or substantially free of dissolved polymer and comprise a reagent that crosslinks PVA. The reagent may crosslink PVA either ionically or covalently or a combination of both types of reagents may be used. Appropriate crosslinking ions include but are not limited to cations such as calcium, magnesium, barium, strontium, boron, beryllium, aluminum, iron, copper, cobalt, lead, silver, zirconium and zinc ions. Boron compounds such as boric acid and zirconium compounds such as zirconium nitrate or zirconium carbonate are particularly preferred. Examples of covalent crosslinking reagents include polycarboxylic acids or anhydrides; polyamines; epihalohydrins; diepoxides; dialdehydes; diols; carboxylic acid halides, ketenes and like compounds. The amount of the solution applied onto the films can vary widely depending on its composition. For example, a wet film coverage as low as 1 cc/m2 and as high as 100 cc/m2 are possible. Low wet film coverages are desirable to reduce the drying time needed.

FIGS. 4 through 8 serve to illustrate some of the multilayer optical compensation film composites that may be constructed based on the detailed teachings provided hereinabove, but they are not intended to be exhaustive of all possible variations. For example, the order of the first and second layers in FIG. 4 could be reversed such that the second layer 168 is adjacent to the carrier substrate 170 and the first layer 162 is farthest away from the carrier substrate 170. One skilled in the art could conceive of many other layer combinations that would be useful as multilayer optical compensation film composites, including cover sheets for use in the preparation of polarizer plates for LCDs, that incorporate a multilayer optical compensation film.

Carrier substrates suitable for the use in the multilayer optical compensation film composites disclosed herein include polyethylene terephthalate (PET), polyethylene naphthalate (PEN), polycarbonate, polystyrene, and other polymeric films. Additional substrates may include paper, laminates of paper and polymeric films, glass, cloth, aluminum and other metal supports. Preferably, the carrier substrate is a polyester film comprising polyethylene terephthalate (PET) or polyethylene naphthalate (PEN). The thickness of the carrier substrate is typically about 20 to 200 micrometers, and beneficially about 40 to 100 micrometers. Thinner carrier substrates are desirable due to both cost and the weight per roll of multilayer optical compensation film composite. However, carrier substrates less than about 20 micrometers may not provide sufficient dimensional stability or protection for the multilayer optical compensation film.

The carrier substrate may be coated with one or more subbing layers or may be pretreated with electrical discharge devices to enhance the wetting of the substrate by coating solutions. Since the multilayer optical compensation film must ultimately be peeled from the carrier substrate the adhesion between multilayer optical compensation film and substrate is an important consideration. Subbing layers and electrical discharge devices may also be employed to modify the adhesion of the multilayer optical compensation film to the carrier substrate. Subbing layers may therefore function as either primer layers to improve wetting or release layers to modify the adhesion of the multilayer optical compensation film to the substrate. The carrier substrate may be coated with two subbing layers, one layer acting as a primer layer to improve wetting and the other layer acting as a release layer. The thickness of the subbing layer is typically 0.05 to 5 micrometers, preferably 0.1 to 1 micrometers.

Multilayer optical compensation film/substrate composites having poor adhesion might be prone to blister after application of a second or third wet coating in a multi-pass operation. To avoid blister defects, adhesion should be greater than about 0.3 N/m between the first-pass layer of the multilayer optical compensation film and the carrier substrate. As already mentioned, the level of adhesion may be modified by a variety of web treatments including various subbing layers and various electronic discharge treatments. However, excessive adhesion between the multilayer optical compensation film and substrate is also undesirable since the multilayer optical compensation film may be damaged during subsequent peeling operations. In particular, multilayer optical compensation film/substrate composites having too great an adhesive force may peel poorly. The maximum adhesive force that allows acceptable peel behavior is dependent on the thickness and tensile properties of the multilayer optical compensation film. Typically, an adhesive force between the multilayer optical compensation film and the substrate greater than about 300 N/m may peel poorly. Multilayer optical compensation films peeled from such excessively well-adhered composites exhibit defects due to tearing of the multilayer optical compensation film and/or due to cohesive failure within the sheet. In a preferred embodiment, the adhesion between the multilayer optical compensation film and the carrier substrate is less than 250 N/m. Most preferably, the adhesion between the multilayer optical compensation film and the carrier substrate is between 0.5 and 25 N/m.

In one embodiment, the carrier substrate is a polyethylene terephthalate film having a first subbing layer (primer layer) comprising a vinylidene chloride copolymer and second subbing layer (release layer) comprising polyvinyl butyral. In another preferred embodiment, the carrier substrate is polyethylene terephthalate film that has been pretreated with a corona discharge prior to application of the multilayer optical compensation film.

The substrates may have other functional layers such as antistatic layers containing various polymer binders and conductive addenda in order to control static charging and dirt and dust attraction. The antistatic layer may be on either side of the carrier substrate, preferably it is on the side of the carrier substrate opposite to the multilayer optical compensation film.

On the side of the substrate opposite to the multilayer optical compensation film a backing layer may also be employed in order to provide a surface having appropriate roughness and coefficient of friction for good winding and conveyance characteristics. In particular, the backing layer comprises a polymeric binder such as a polyurethane or acrylic polymer containing matting agent such a silica or polymeric beads. The matting agent helps to prevent the sticking of the front side of the multilayer optical compensation film composite to the backside during shipping and storage. The backing layer may also comprise a lubricant to provide a coefficient of friction of about 0.2 to 0.4. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However for lasting lubricity a polymerizable lubricant such as Additive 31, a methacryloxy-functional silicone polyether copolymer (from Dow Coming Corp.) is preferred.

Low birefringence polymer films suitable for use as first layers in the multilayer optical compensation film comprise polymeric materials that form high clarity films with high light transmission (i.e., >85%) in the visible range but with inherently low levels of birefringence. Preferably, the low birefringence polymer film has in-plane birefringence, $\Delta n_{in}$, of less than about $1 \times 10^{-4}$ and an out-of-plane birefringence, $\Delta n_{th}$, of from 0.005 to -0.005.

Exemplary polymeric materials for use in the low birefringence polymer first layers of the multilayer optical compensation film include cellulose esters (including triacetyl cellulose (TAC), cellulose diacetate, cellulose acetate butyrate, cellulose acetate propionate), polycarbonates (such as Lexan® available from General Electric Corp.), polysulfones (such as Udel® available from Amoco Performance Products Inc.), polyarylates, and cyclic olefin polymers (such as Arton® available from JSR Corp., Zeonex® and Zeonor® available from Nippon Zeon, Topas® supplied by Ticona), among others. Preferably, the low birefringence polymer first layer comprises TAC, or cyclic olefin polymers due their commercial availability and excellent optical properties.

The low birefringence polymer first layer has a thickness from about 5 to 100 μm, preferably from about 5 to 50 μm and most preferably from about 10 to 40 μm. Films having thickness of 10 to 40 μm are most preferred due to cost, handling, ability to provide thinner polarizer plates, improved light transmission, and freedom from curl on the carrier substrate. Conventional multilayer optical compensation films comprising a low birefringence polymer film thickness of about 80 μm have a total thickness of between 81 and 200 μm. In a preferred embodiment, a multilayer optical compensation film as disclosed herein may have a total thickness of less than 80 μm, preferably less than 60 μm, and most preferably less than 40 μm.

Meanwhile, in some embodiments of a multilayer optical compensation film, a contiguous first layer is provided on the low birefringence polymer first layer. The contiguous first layer may serve as a barrier layer to prevent solvents from permeating a low birefringence polymer first layer material such as TAC.

Beneficially, the barrier layer comprises a polymer having little or no out-of-plane birefringence that is water soluble or water dispersible. Water soluble polymers suitable for use in the barrier layer include polyvinyl alcohols and copolymers thereof, gelatin, gelatin derivatives, casein, agar, sodium alginate, starch, acrylic acid containing polymers, maleic anhydride containing polymers, hydrophilic cellulose esters such as carboxymethylcellulose, hydroxypropyl methyl cellulose, and polyacrylamides. Suitable water dispersible polymers include polyesters, particularly polyester ionomers, polyurethanes, and latex polymers having hydrophilic functionality such as methacrylic acid containing polymers, maleic anhydride containing polymers, itaconic acid containing polymers, styrene sulfonic acid containing polymers, and the like.

In order to optimize both barrier properties and adhesion to contiguous layers, the barrier layer typically will contain two or more polymers. For example, the barrier layer may contain a water-soluble polymer such as gelatin and a water dispersible polymer such as a polyester ionomer. Alternatively, the barrier layer may contain two different water dispersible polymers such as a polyester ionomer and a polyurethane.

The barrier layer may be crosslinked using known methods such as the addition of crosslinking agents, such at isocyanates, aldehydes, vinyl sulfone materials, aziridines and melamine resins or by exposure of the dried layer to actinic radiation.

The barrier layer is generally applied at dried coating weights between 50 and 6000 mg/m$^2$, more typically between 100 and 1000 mg/m$^2$. Barrier layer dried coating weights less than 35 mg/m$^2$ are insufficient to prevent the diffusion of organic solvents from penetrating other first layers such as TAC film.

The contiguous first layer may comprise one or more of the various polymer compositions as listed in Table A below.

TABLE A

| | |
|---|---|
| B-1 | Celvol 103 (Celanese) |
| B-2 | Eastek 1100 Alcohol Free (Eastman) + Elvanol 52-22 (Dupont) |
| B-3 | Elvanol 52-22 |

Generally the levels of in-plane and out-plane retardation achievable with a first layer such as a TAC film are limited. Increase in both retardation components requires addition of an appropriate birefringent second layer to the TAC film.

Accordingly, a birefringent second layer is provided adjacent to either a first layer (e.g., TAC) or a contiguous first layer (e.g., a barrier layer) when present.

In the case where the out-of-plan retardation ($R_{th}$) of the multilayer optical compensation film is more negative than −20 nm, at least one second layer includes a polymer containing in the backbone a non-visible chromophore group. The polymer may contain in the backbone a nonvisible chromophore containing a vinyl, carbonyl, amide, imide, ester, carbonate, aromatic, sulfone, or azo, phenyl, naphthyl, biphenyl, bisphenol, or thiophene group. Examples of polymers suitable for the second layers include (1) a poly(4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2, 2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4, 4'-isopropylidene-2,2',6,6'-tetrabromo)-bisphenol terephthalate, (6) a poly(4,4'-isopropylidene-bisphenol-co-4,4'-(2-norbornylidene)bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing.

Other specific examples of the second layer, in the case where the out-of-plane retardation (Rth) of the multilayer compensator is more negative than −20 nm, include polyesters made from the acid chloride and bisphenol/diol structures presented below. One could also conveniently synthesize polyamides from the same diacidchlorides and then substituting analogous diamines for the bisphenol/diols.

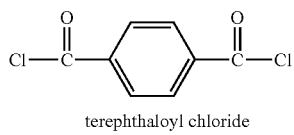

terephthaloyl chloride

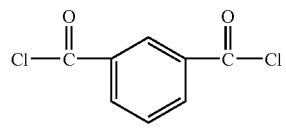

isophthaloyl chloride

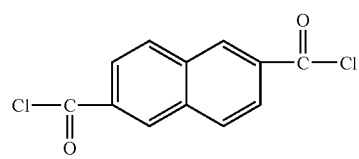

2, 6-naphthaloyl chloride

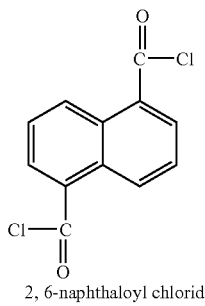

2, 6-naphthaloyl chloride

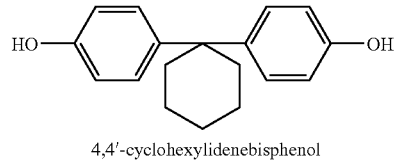

4,4'-cyclohexylidenebisphenol

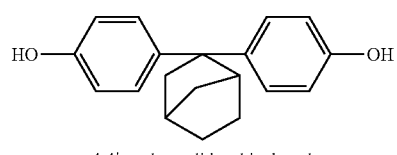

4,4'-norbornylidenebisphenol

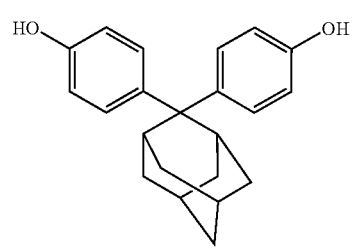

4,4'-2,2'-adamantanediyl)diphenol

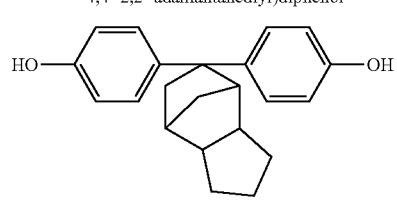

4,4'-hexahydro-4,7-methanoindane-5-ylidene)bisphenol

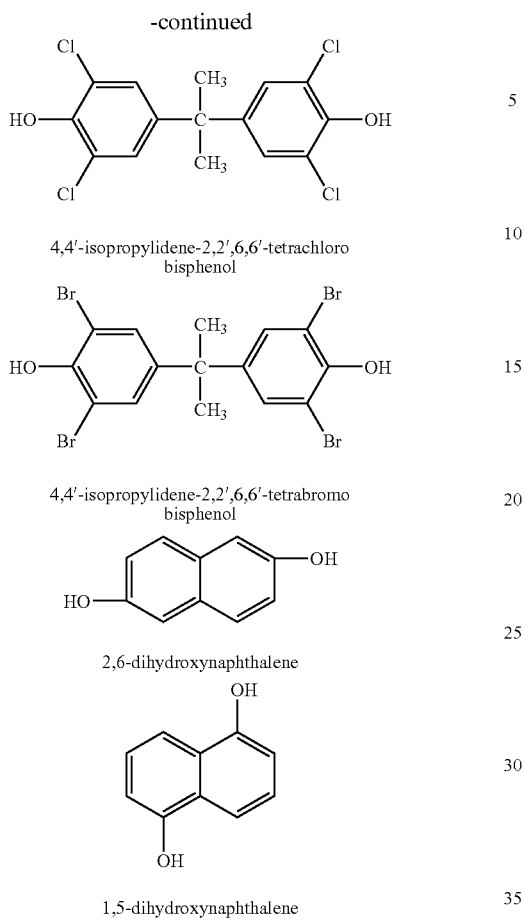

4,4'-isopropylidene-2,2',6,6'-tetrachloro bisphenol 4,4'-isopropylidene-2,2',6,6'-tetrabromo bisphenol 2,6-dihydroxynaphthalene 1,5-dihydroxynaphthalene In the case where the out-of-plane retardation ($R_{th}$) of the multilayer optical compensation film is more positive than +20 nm, at least one second layer includes a polymer which contains off the backbone a non-visible chromophore group. The non-visible chromophore group may include a carbonyl, amide, imide, ester, carbonate, phenyl, naphthyl, biphenyl, bisphenol, or thiophene group, or a heterocyclic or carbocyclic aromatic group. The polymer of the second layer may contain in the backbone a vinyl, carbonyl, amide, imide, ester, carbonate, aromatic, sulfone, or azo group. Examples of suitable polymers for the second layer include (A) poly (4 vinylphenol), (B) poly (4 vinylbiphenyl), (C) poly (N-vinyl-carbazole), (D) poly(methylcarboxyphenylmethacrylamide), (E) poly[(1-acetylindazol-3-ylcarbonyloxy)ethylene], (F) poly(phthalimidoethylene), (G) poly(4-(1-hydroxy-1-methylpropyl)styrene), (H) poly(2-hydroxymethylstyrene), (I) poly(2-dimethylaminocarbonylstyrene), J) poly(2-phenylaminocarbonylstyrene), (K) poly(3-(4-biphenylyl)styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (Q) poly(2,5-diisopropylstyrene), and (and R) poly(2,4,6-trimethylstyrene) or (S) copolymers of any two or more of the foregoing.

Other specific examples of the second layer, in the case where the out-of-plane retardation ($R_{th}$) of the multilayer compensator is more positive than +20 nm, are presented below with their corresponding structures.

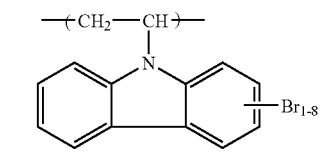

Brominated polyvinylcarbazole

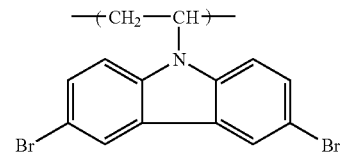

Polyvinyldibromocarbazole

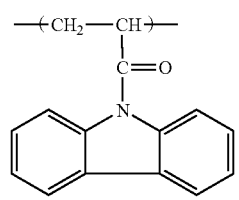

Polyacrylylcarbazole

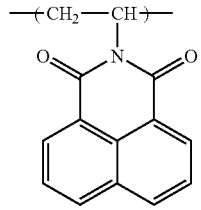

Poly N-vinylnapthalimide

Cellulosic derivatives such as:

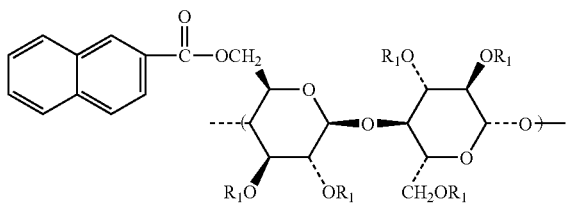

Cellulosediacetatenapthalate
(where each R1 is independently an ethyl group, a methyl group, a propyl group or a butyl group)

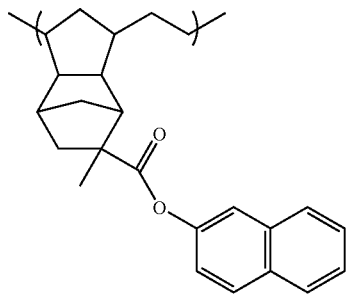

Poly[[octahydro-5-(napthyloxycarbonyl)-5-methyl-4,7-methano-1H-indene-1,3-diyl]-1,2-ethanediyl]

Beneficially, the birefringent second layer may comprise a polycarbonate (PC). Exemplary PCs are listed in Table B below (the source of each polycarbonate is indicated in parentheses) with the corresponding glass transition temperature (Tg) as measured using differential scanning calorimetry (DSC).

TABLE B

| | Material (2$^{nd}$ Layer) | Tg (° C.) |
|---|---|---|
| PC-1 | LEXAN ® 131-112(GE) | 150 |
| PC-2 | MAKROLON ® DPI-1265 (Bayer) | 145 |
| PC-3 | APEC ® 1803 (Bayer) | 180 |
| PC-4 | PANLITE ® AD5503(Teijin) | 145 |
| PC-5 | HYLEX ® (Entec) | 162 |
| PC-6 | MAKROLON ® 5705(Bayer) | 160 |
| PC-7 | LEXAN ® 141-112(GE) | 147 |

When the birefringent second layer comprises an amorphous polymer, it requires rapid drying to retain its birefringence. When the drying is relatively rapid the solvent does not soften the second layer sufficiently to allow relaxation of the polymer molecules. The thickness of the second polymer layer can be varied to control the optical properties of the multilayer optical compensation film.

The $R_{in}$ of the birefringent second layer, and hence the $R_{in}$ of the multilayer optical compensation film, can be manipulated by changes in the stretching extent (stretch ratio) and temperature applied during a stretching step following the application of the second layer by coating or by other means such as lamination.

In particular, it has been found by the inventors that stretching of an already dried multilayer optical compensation film ("dry stretching") can produce desirable amounts of in-plane anisotropy. As used herein, the term "machine direction" means a direction coincident with a casting or coating direction of the film. Stretching can occur in the machine direction. Alternately, or in addition, stretching can occur in a direction perpendicular to the machine direction, which is referred to as the transverse direction. Stretching in both the machine and transverse directions can be done sequentially or simultaneously. Also alternatively, or in addition, stretching can occur obliquely relative to the transverse direction (i.e. in a diagonal direction).

In dry-stretching, stresses applied to the sheet after coating can control the in-plane (x,y) retardation and the thickness and type of the second layer polymer can control the out-of-plane retardation. Beneficially, the use of amorphous polymers can provide a simple and cost-effective way to create a useful multiplayer compensator.

In particular, by stretching an already dried multilayer optical compensation film it is possible to produce very high in-plane retardation.

This stretching, or active tentering, process may be accomplished by stretching the multilayer optical compensation film composite including the carrier support. Alternatively, or in addition, the multilayer optical compensation film may be stretched after having been separated from the carrier support.

Stretching can be accomplished by means of a drawing frame such as a tenter frame whereby the coated film is pre-heated to a desired temperature and then fed to edge restraint belts. The edge belts are two endless belts, which are brought together to form a serpentine path, with the drying film clamped between the two belts using appropriate clamping mechanism. These belts are described in U.S. Pat. Nos. 6,152,345 and 6,108,930, the contents of which are incorporated herein by reference. The multilayer optical compensation film is then drawn widthwise, in the transverse direction, thereby orienting the multilayer optical compensation film in the transverse direction. The ratio of the final to the initial width of the drawn multilayer optical compensation film is referred to as the stretch ratio. Drawing in the machine direction (machine direction orientation) can be accomplished by passing the heated multilayer optical compensation film through a pair of rollers moving at variable speeds. The ratio of the linear speeds of the rollers is the corresponding stretch ratio. These drawing steps can be combined simultaneously or sequentially, to achieve biaxial drawing of the film.

Drawing can be achieved also if the multilayer optical compensation film is not completely dry. In this so-called "wet" stretching the multilayer optical compensation film is drawn while still containing solvent, which is removed during or after stretching. If the edges of the multilayer optical compensation film are simply held during the drying step some orientation and in-plane retardation can be generated during the drying step due to the restraint applied on the shrinking film. This is not tentering in the usual sense, but merely the restraining of shrinkage forces as the polymer sheet dries. It shall be referred to as "passive tentering".

To facilitate the above-described stretching process, beneficially the second layer comprises a polymer having a glass transition temperature $(T_g)>110°$ C. More beneficially, the second layer comprises a polymer having a $T_g>145°$ C. Preferably, the second layer comprises a polymer having a $T_g>180°$ C.

Advantageously, stretching can be performed on the multilayer optical compensation film composite including the carrier substrate, or only on the multilayer optical compensation film itself after detachment from the carrier substrate.

In the examples below, the multilayer optical compensation films were stretched by dry stretching methods, i.e., a dried composite film was stretched uniaxially on a film stretcher using two stretching modes as indicated in Table C below. The stretching was done at elevated temperatures. However, it should be understood that the invention is not limited to multilayer optical compensation films stretched uniaxially on a film stretcher using the two stretching modes of Table C.

TABLE C

| S-1 | uniaxial unconstrained |
|---|---|
| S-2 | uniaxial constrained |

In the uniaxial unconstrained stretching mode (S-1) the multilayer optical compensation film was held in one direction, heated to a temperature and stretched along the held direction to a desired stretch ratio (strain). The stretch ratio is defined as the ratio of the final dimension after stretching to the initial dimension prior to stretching. This stretching mode is similar to machine direction orientation. In the uniaxial constrained mode (S-2) the multilayer optical compensation film was held in both directions, heated to a temperature and stretched in one of the held direction to a desired stretch ratio. This stretching mode is very similar to tentering. The multilayer optical compensation film was then cooled to room temperature before the tension was removed. The in-plane ($R_{in}$) and out-of-plane ($R_{th}$) retardations were measured using the M-2000V Spectroscopic Ellipsometer (Woolam Co.).

The conditions used to prepare the exemplary multilayer optical ation films are listed in the Table D below.

TABLE D

| Example | First Coated Layer (FCL) | Thickness of FCL (μm) | Second Coated Layer (SCL) | Thickness of SCL (μm) | Stretch Temp. (° C.) | Stretching Mode | Stretch Ratio |
|---|---|---|---|---|---|---|---|
| 1  | B-1 | 1.8 | PC-1 | 6  | 140 | S-2 | 1.1 |
| 2  | B-1 | 1.8 | PC-1 | 6  | 140 | S-2 | 1.2 |
| 3  | B-1 | 1.8 | PC-1 | 6  | 155 | S-2 | 1.1 |
| 4  | B-1 | 1.8 | PC-1 | 6  | 155 | S-2 | 1.2 |
| 5  | B-1 | 1.8 | PC-1 | 6  | 155 | S-2 | 1.3 |
| 6  | B-1 | 1.8 | PC-1 | 6  | 155 | S-2 | 1.35 |
| 7  | B-2 | 2   | PC-2 | 6  | 140 | S-2 | 1.2 |
| 8  | B-2 | 2   | PC-3 | 6  | 140 | S-1 | 1.2 |
| 9  | B-2 | 2   | PC-4 | 6  | 140 | S-1 | 1.2 |
| 10 | B-2 | 2   | PC-5 | 2  | 140 | S-1 | 1.2 |
| 11 | B-2 | 2   | PC-5 | 6  | 140 | S-1 | 1.2 |
| 12 | B-2 | 2   | PC-7 | 6  | 140 | S-1 | 1.2 |
| 13 | B-2 | 2   | PC-1 | 6  | 140 | S-1 | 1.2 |
| 14 | B-2 | 2   | PC-6 | 10 | 140 | S-1 | 1.2 |
| 15 | B-2 | 2   | PC-6 | 10 | 165 | S-1 | 1.2 |
| 16 | B-3 | 2.5 | PC-1 | 10 | 155 | S-2 | 1.2 |
| 17 | B-1 | 2.5 | PC-1 | 10 | 155 | S-2 | 1.2 |

The resulting in-plane retardation ($R_{in}$) and out-of-plane retardation ($R_{th}$) values at a wavelength of 590 nm for the above exemplary multilayer optical compensation films are listed in Table E below.

TABLE E

| Example | $R_{in}$ (nm) | $R_{th}$ (nm) |
|---|---|---|
| 1  | 44  | −124 |
| 2  | 63  | −159 |
| 3  | 29  | −84  |
| 4  | 51  | −108 |
| 5  | 65  | −125 |
| 6  | 80  | −142 |
| 7  | 54  | −142 |
| 8  | 93  | −138 |
| 9  | 55  | −123 |
| 10 | 66  | −111 |
| 11 | 102 | −157 |
| 12 | 80  | −147 |
| 13 | 89  | −150 |
| 14 | 94  | −153 |
| 15 | 86  | −109 |
| 16 | 67  | −128 |
| 17 | 76  | −131 |

The out-of-plane birefringence for the multilayer optical compensation films in the above examples ranges from −0.006 (Example 3) to −0.016 (Example 11). A comparative film was made by stretching an 80 μm TAC film at stretch ratio of 1.3 and a temperature of 150° C. in a uniaxially constrained mode (S-1). The stretched TAC film has $R_{in}$ value of 28 nm and an $R_{th}$ of −34 nm (corresponding to an out-plane birefringence of −0.0005). These values would not be sufficient to provide adequate compensation for VA-mode LCD.

It is shown in the above examples that a multilayer optical compensation film comprising a thin polycarbonate layer can attain $R_{in}$ values in the range of approximately 30 to 100 nm and $R_{th}$ values in the range of −100 nm to −160 nm. These values fall in a range wherein effective compensation of VA-mode LCD's is possible. The values of $R_{in}$ and $R_{th}$ can be further adjusted through changes in the thickness of the birefringent second layer, the stretching temperature, the stretch ratio, and the stretching mode.

The present invention is further illustrated by the following non-limiting example of its practice.

A 100 micrometer thick poly(ethylene terephthalate) (PET) carrier substrate having an antistatic backing layer (backside) is coated on its front surface with an adhesion promoting layer comprising Gohsenol NM-14 PVA (polyvinyl alcohol having a degree of hydrolysis of about 99%, available from Nippon Gohsei) having a dry coating weight of about 25 mg/ft2 (250 mg/m2). The dried layer is then overcoated with a triacetyl cellulose (TAC) formulation comprising four layers: a surface layer comprising CA-436-80S (triacetyl cellulose from Eastman Chemical) having a dry coating weight of about 198 mg/ft2 (1980 mg/m2), dihexyl cyclohexane dicarboxylate having a dry coating weight of about 20 mg/ft2 (200 mg/m2), and Surflon® S-8405-S50 (a fluorinated surfactant from Semi Chemical Co. Ltd) having a dry coating weight of about 10 mg/ft2 (100 mg/m2); a second layer comprising CA-436-80S having a dry coating weight of about 1752 mg/ft2 (17520 mg/m2), dihexyl cyclohexane dicarboxylate having a dry coating weight of about 175 mg/ft2 (1750 mg/m2), TINUVIN® 8515 UV absorber having a dry coating weight of about 53 mg/ft$^2$ (530 mg/m$^2$); TINUVIN® 326 UV absorber having a dry coating weight of about 22 mg/ft$^2$ (22 mg/m$^2$); a third layer as a tie layer comprising Carboset® 525 (Noveon Inc.) having a dry coating weight of about 99 mg/ft2 (990 mg/m2); a lower layer as an additional tie layer comprising a copolymer of poly(ethyl acrylate-co-vinylidene chloride-co-acrylic acid) with a monomer ratio of 31/61/8. The TAC formulation was applied with a multi-slot slide hopper using a mixture of methylene chloride and methanol as the coating solvent. A layer of polyvinyl alcohol (Celanese Celvol 103) material was coated from an aqueous mixture, at a thickness of 100 mg/ft$^2$, onto the TAC surface layer, on the side opposite of the PET substrate.

After drying, a birefringent amorphous polyester polymer layer was further coated on the polyvinyl alcohol layer, using conventional coating methods. The polymer (poly(4,4'-hexafluoroisopropylidene-bisphenol-co-4,4'-(2-norbornylidene) bisphenol) terephthalate-co-isophthalate) was dissolved in a mixture of 90% ethyl acetate and 10% propyl acetate, then coated and dried.

The dry composite film was then stretched uniaxially on a film stretcher using a uniaxial constrained mode. In this mode the film was held in both directions, heated to a temperature and stretched in one of the held directions to a desired stretch ratio. The composite film was then cooled to room temperature before the tension was removed. The PET substrate was peeled off of the composite film and the retardation of the film was evaluated using the M-2000V Spectroscopic Ellipsometer (J.A. WOOLLAM CO.®). The in-plane ($R_{in}$) and out-of-plane ($R_{th}$) retardations were measured, at a wavelength of 590 nm. The haze was measured using a Haze-gard Plus (BYK GARDNER®) according to ASTM D-1003 and ASTM D10044 standards. The conditions used to prepare the exemplary composite film, the in-plane ($R_{in}$), out-of-plane ($R_{th}$) retardation value, and haze are listed in Table F below.

TABLE F

| Example | Stretch Temperature (° C.) | Stretch Ratio | Rin (nm) | Rth (nm) | Haze (%) |
|---|---|---|---|---|---|
| 18 | 141 | 1.2 | 55 | −157 | 1.9 |

This example illustrates that a multilayer compensation film can be prepared with sufficiently high in-plane and out-of-plane retardation values using a process comprising coating a thick TAC layer together with a birefringent layer and appropriate functional layers onto a disposable carrier substrate and then stretching the composite film under appropriate conditions. The multiplayer compensator can then be peeled of the carrier substrate while still retaining fairly high levels of retardation.

The out of plane retardation ($R_{th}$) of an 80 μm TAC sheet varies from approximately −80 nm to an annealed value of about −40 nm. The TAC $R_{th}$ can be manipulated by changes in the casting surface time and temperature in the restrained heating section.

In a preferred embodiment, the multilayer optical compensation film composite also includes a strippable, protection layer on the surface of the multilayer optical compensation film opposite to the carrier substrate. The strippable, protection layer may be applied by coating the layer or it may be applied by adhesively adhering or by electrostatically adhering, a preformed protection layer. Preferably, the protection layer is a transparent polymer layer. In one particular embodiment, the protection layer is a low birefringence layer that allows optical inspection of the multilayer optical compensation film without the need to remove the protection layer. Particularly useful polymers for use in the protection layer include: cellulose esters, acrylics, polyurethanes, polyesters, cyclic olefin polymers, polystyrene, polyvinyl butyral, polycarbonate, and others. When a preformed protection layer is used, it is preferably a layer of polyester, polystyrene, or polyolefin film.

The strippable, protection layer is typically 5 to 100 μm in thickness. Preferably, the protection layer is 20 to 50 μm thick to insure adequate resistance to scratch and abrasion and provide easy handling during removal of the protection layer.

When the strippable, protection layer is applied by coating methods it may be applied to an already coated and dried multilayer optical compensation film or the protection layer may be coated simultaneously with one or more layers comprising the multilayer optical compensation film.

When the strippable, protection layer is a preformed layer it may have a pressure sensitive adhesive layer on one surface that allows the protection layer to be adhesively laminated to the multilayer optical compensation film composite using conventional lamination techniques. Alternatively, the preformed protection layer may be applied by generating an electrostatic charge on a surface of the multilayer optical compensation film or the preformed protection layer and then bringing the two materials into contact in a roller nip. The electrostatic charge may be generated by any known electric charge generator, e.g., a corona charger, a tribocharger, conducting high potential roll charge generator or contact charger, a static charge generator, and the like. The multilayer optical compensation film or the preformed protection layer may be charged with a DC charge or a DC charge followed by an AC charge in order to create an adequate level of charge adhesion between the two surfaces. The level of electrostatic charge applied to provide a sufficient bond between the multilayer optical compensation film and the preformed protection layer is at least more than 50 volts, preferably at least more than 200 volts. The charged surface of the multilayer optical compensation film or the protection layer has a resistivity of at least about $10^{12}$ Ω/square, preferably at least about $10^{16}$ Ω/square in order to insure that the electrostatic charge is long lasting.

The multilayer optical compensation film composite may contain an abrasion resistant layer on the same side of the carrier substrate as the multilayer optical compensation film. Preferably, the abrasion resistant layer is located on the side of the multilayer optical compensation film opposite to the carrier.

Particularly effective abrasion resistant layers for use with multilayer optical compensation films comprise radiation or thermally cured compositions, and preferably the composition is radiation cured. Ultraviolet (UV) radiation and electron beam radiation are the most commonly employed radiation curing methods. UV curable compositions are particularly useful for creating the abrasion resistant layer and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C═C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the abrasion layer are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra (meth)acrylate, pentaerythritol tri(meth)acrylate, dipentaerythritol hexa(meth)acrylate, 1,6-hexanediol di(meth) acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

Among others, conveniently used radiation curable lacquers include urethane methacrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers that are commercially available include oligomers from Sartomer Company (Exton, Pa.). An example of a resin that is conveniently used in this process is CN 968® from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. Conveniently used initiators are 1-hydroxycyclohexyl phenyl ketone and 2-methyl-1-[4-(methyl thio)phenyl]-2-morpholinopropanone-1.

The abrasion resistant layer is typically applied after coating and drying the multilayer optical compensation film. Beneficially, the abrasion resistant layer is applied as a coating composition that typically also includes organic solvents. Preferably the concentration of organic solvent is 1-99% by weight of the total coating composition.

Examples of solvents employable for coating the abrasion resistant layer include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion of the abrasion resistant layer can be improved while minimizing migration of plasticizers and other addenda from the first layer of the multilayer optical compensation film, enabling the hardness of the abrasion resistant layer to be maintained. Suitable solvents for a TAC first layer are aromatic hydrocarbon and ester solvents such as toluene and propyl acetate.

The UV polymerizable monomers and oligomers are coated and cross-linked dried, and subsequently exposed to UV radiation to form an optically clear abrasion resistant layer. The preferred UV cure dosage is between 50 and 1000 mJ/cm$^2$.

The thickness of the abrasion resistant layer is generally about 0.5 to 50 micrometers preferably 1 to 20 micrometers, more preferably 2 to 10 micrometers.

The abrasion resistant layer is preferably colorless, but it is specifically contemplated that this layer can have some color for the purposes of color correction, or for special effects, so long as it does not detrimentally affect the formation or viewing of the display through the overcoat. Thus, there can be incorporated into the polymer dyes that will impart color. In addition, additives can be incorporated into the polymer that will give to the layer desired properties. Other additional compounds may be added to the coating composition, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like.

The abrasion resistant layer typically provides a layer having a pencil hardness (using the Standard Test Method for Hardness by Pencil Test ASTM D3363) of at least 2H and preferably 2H to 8H.

The multilayer optical compensation film composite may contain a moisture barrier layer on the same side of the carrier substrate as the multilayer optical compensation film. The moisture barrier layer may be located on one or both sides of the multilayer optical compensation film. The moisture barrier layer comprises a hydrophobic polymer such as a vinylidene chloride polymer, vinylidene fluoride polymer, polyurethane, polyolefin, fluorinated polyolefin, polycarbonate, and others, having a low moisture permeability. Preferably, the hydrophobic polymer comprises vinylidene chloride. More preferably, the hydrophobic polymer comprises 70 to 99 weight percent of vinylidene chloride. The moisture barrier layer may be applied by application of an organic solvent-based or aqueous coating formulation. To provide effective moisture barrier properties the layer should be at least 1 micrometer in thickness, preferably from 1 to 10 micrometers in thickness, and most preferably from 2 to 8 micrometers in thickness. Beneficially, the multilayer optical compensation film comprising a moisture barrier layer has a moisture vapor transmission rate (MVTR) according to ASTM F-1249 that is less than 1000 g/m$^2$/day, preferably less than 800 g/m$^2$/day and most preferably less than 500 g/m$^2$/day. The use of such a moisture barrier layer in the multilayer optical compensation film provides improved resistance to changes in humidity and increased durability of the multilayer optical compensation film, especially for TAC multilayer optical compensation films having a thickness less than about 40 micrometers.

The multilayer optical compensation film composite may contain a transparent antistatic layer on the same side of the carrier substrate as the low birefringence polymer film. The antistatic layer may be located on either side of the low birefringence polymer film. The antistatic layer aids in the control of static charging that may occur during the manufacture and use of the multilayer optical compensation film composite. Effective control of static charging reduces the propensity for the attraction of dirt and dust to the multilayer optical compensation film composite. The multilayer optical compensation film composite may be particularly prone to triboelectric charging during the peeling of the multilayer optical compensation film from the carrier substrate. The so-called "separation charge" that results from the separation of the multilayer optical compensation film and the substrate can be effectively controlled by an antistatic layer having a resistivity of less than about $1\times10^{11}$ $\Omega$/square, preferably less than $1\times10^{10}$ $\Omega$/square, and most preferably less than $1\times10^{9}$ $\Omega$/square.

Various polymeric binders and conductive materials may be employed in the antistatic layer. Polymeric binders useful in the antistatic layer include any of the polymers commonly used in the coating art, for example, interpolyymers of ethylenically unsaturated monomers, cellulose derivatives, polyurethanes, polyesters, hydrophilic colloids such as gelatin, polyvinyl alcohol, polyvinyl pyrrolidone, and others.

Conductive materials employed in the antistatic layer may be either ionically-conductive or electronically-conductive ionically-conductive materials include simple inorganic salts, alkali metal salts of surfactants, polymeric electrolytes containing alkali metal salts, and colloidal metal oxide sols (stabilized by metal salts). Of these, ionically-conductive polymers such as anionic alkali metal salts of styrene sulfonic acid copolymers and cationic quaternary ammonium polymers of U.S. Pat. No. 4,070,189 and ionically-conductive colloidal metal oxide sols which include silica, tin oxide, titania, antimony oxide, zirconium oxide, alumina-coated silica, alumina, boehmite, and smectite clays are preferred.

The antistatic layer preferably contains an electronically-conductive material due to their humidity and temperature independent conductivity. Suitable materials include: 1) electronically-conductive metal-containing particles including donor-doped metal oxides, metal oxides containing oxygen deficiencies, and conductive nitrides, carbides, and bromides. Specific examples of particularly useful particles include conductive $SnO_2$, $In_2O$, $ZnSb_2O_6$, $InSbO_4$, $TiB_2$, $ZrB_2$, $NbB_2$, $TaB_2$, $CrB$, $MoB$, $WB$, $LaB_6$, $ZrN$, $TiN$, $WC$, $HfC$, $HfN$, and $ZrC$. Examples of the patents describing these electrically conductive particles include; U.S. Pat. Nos. 4,275,103; 4,394,441; 4,416,963; 4,418,141; 4,431,764; 4,495,276; 4,571,361; 4,999,276; 5,122,445; and 5,368,995; 2) fibrous electronic conductive particles comprising, for example, antimony-doped tin oxide coated onto non-conductive potassium titanate whiskers as described in U.S. Pat. Nos. 4,845,369 and 5,166,666, antimony-doped tin oxide fibers or whiskers as described in U.S. Pat. Nos. 5,719,016 and 5,0731,119, and the silver-doped vanadium pentoxide fibers described in U.S. Pat. No. 4,203,769; and 3) electronically-conductive polyacetylenes, polythiophenes, and polypyrroles, preferably the polyethylene dioxythiophene described in U.S. Pat. No. 5,370,981 and commercially available from Bayer Corp. as Baytron® P.

The amount of the conductive agent used in the antistatic layer can vary widely depending on the conductive agent employed. For example, useful amounts range from about 0.5 mg/m² to about 1000 mg/m², preferably from about 1 mg/m² to about 500 mg/m². The antistatic layer has a thickness of from 0.05 to 5 micrometers, preferably from 0.1 to 0.5 micrometers to insure high transparency.

The techniques described above allow for the manufacture of multilayer compensators described next. That is, these methods can provide a multilayer compensator comprising one or more first layers and one or more second layers, wherein the first layers comprise a polymer having an out-of-plane birefringence ($\Delta n_{th}$) not more negative than $-0.005$ and not more positive than $+0.005$, and the second layers comprise a polymer having an out-of-plane birefringence more negative than $-0.005$ or more positive than $+0.005$. The overall in-plane retardation ($R_{in}$) of the multilayer compensator is greater than 20 nm and the out-of-plane retardation ($R_{th}$) of the multilayer compensator is more negative than $-20$ nm or more positive than $+20$ nm. Beneficially, two or more of the first and the second layers are contiguous.

Beneficially, a first layer is made from polymer film that has an out-of-plane birefringence ($\Delta n_{th}$) not more negative than $-0.005$ and not more positive than $+0.005$. Examples of such polymers include: cellulosics, such as triacetyl cellulose (TAC), cellulose diacetate, cellulose acetate butyrate; cyclic polyolefin; acrylic; polyarylate containing fluorene groups; and other polymers known to those skilled in the art.

A combined thickness of the second layers is preferably less than 30 micrometers, more preferably from 1.0 to 10 micrometers, and even more preferably from 1 to 8 micrometers.

The overall in-plane retardation ($R_{in}$) of the multilayer compensator is beneficially between 21 nm and 200 nm, more beneficially between 25 nm and 150 nm, and even more preferably between 30 and 100 nm.

A combined thickness of the first and second layers is typically in the range between 81 and 200 µm. In a preferred embodiment, the multilayer compensator as disclosed herein may have total thickness of less than 80 µm, preferably less than 60 µm and most preferably less than 40 µm.

In the case where the out-of-plane retardation ($R_{th}$) of the multilayer compensator is more negative than $-20$ nm, at least one second layer includes a polymer containing in the backbone a non-visible chromophore group. The polymer may include pendant cycloaliphatic groups. For example, the cycloaliphatic groups may be at least one selected from the group of cyclopentane, cyclohexane, norbornene, hexahydro-4,7-methanoindan-5-ylidene, adamantane, and any of the foregoing having fluorine substitution for at least one hydrogen atom. Further, the polymer may contain in the backbone a nonvisible chromophore containing a vinyl, carbonyl, amide, imide, ester, carbonate, aromatic, sulfone, or azo, phenyl, naphthyl, biphenyl, bisphenol, or thiophene group.

In particular, polycarbonates are suitable polymers for the second layers. These materials are condensation polymers prepared typically, but not exclusively, from reacting phosgene with one or more diols (e.g., bis-phenols):

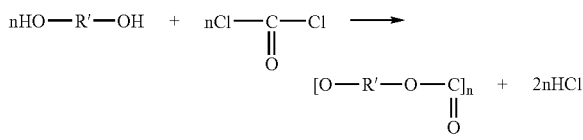

Examples of diol structures suitable for use in the second layers include the following:

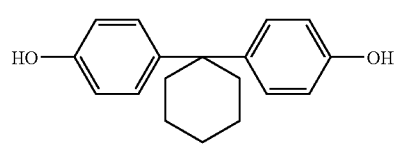

4, 4'-cyclohexylidenebisphenol

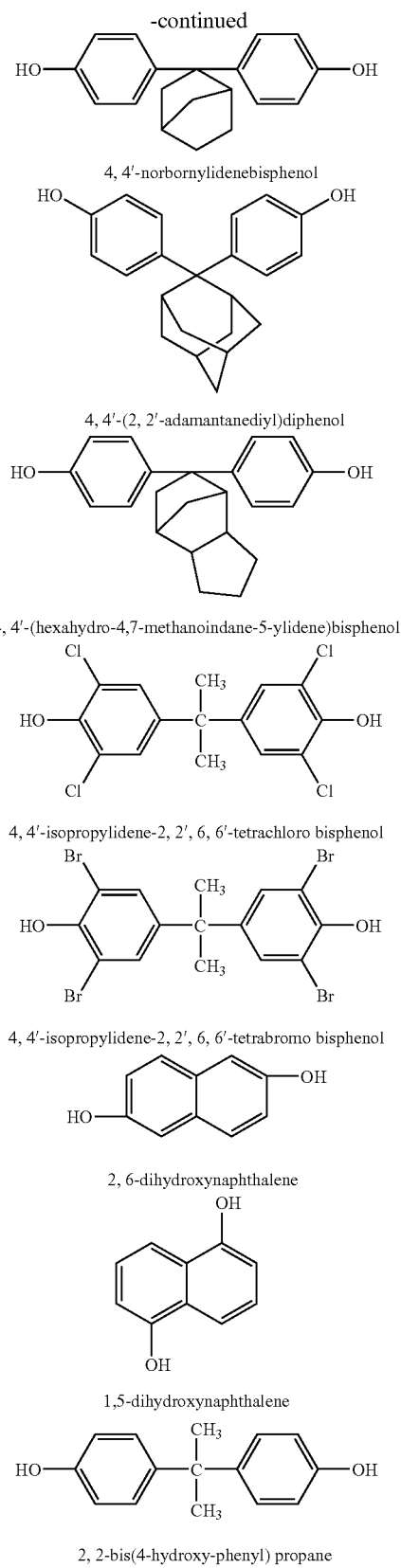

4, 4'-norbornylidenebisphenol 4, 4'-(2, 2'-adamantanediyl)diphenol 4, 4'-(hexahydro-4,7-methanoindane-5-ylidene)bisphenol 4, 4'-isopropylidene-2, 2', 6, 6'-tetrachloro bisphenol 4, 4'-isopropylidene-2, 2', 6, 6'-tetrabromo bisphenol 2, 6-dihydroxynaphthalene 1,5-dihydroxynaphthalene 2, 2-bis(4-hydroxy-phenyl) propane In the case where the out-of-plane retardation ($R_{th}$) of the multilayer compensator is more positive than +20 nm, at least one second layer includes a polymer which contains off the backbone a non-visible chromophore group. The non-visible chromophore group may include a carbonyl, amide, imide, ester, carbonate, phenyl, naphthyl, biphenyl, bisphenol, or thiophene group, or a heterocyclic or carbocyclic aromatic group. The polymer of the second layer may contain off the backbone a vinyl, carbonyl, amide, imide, ester, carbonate, aromatic, sulfone, or azo group. Examples of suitable polymers for the second layer include poly (4 vinylphenol), poly(4 vinylbiphenyl), poly (N-vinylcarbazole), poly(methylcarboxyphenylmethacrylamide), poly[(1-acetylindazol-3-ylcarbonyloxy)ethylene], poly(phthalimidoethylene), poly(4-(1-hydroxy-1-methylpropyl)styrene), poly(2-hydroxymethylstyrene), poly(2-dimethylaminocarbonylstyrene), poly(2-phenylaminocarbonylstyrene), poly(3-(4-biphenylyl) styrene), poly(4-(4-biphenylyl)styrene), poly(4-cyanophenyl methacrylate), poly(2,6-dichlorostyrene), poly(perfluorostyrene), poly(2,4-diisopropylstyrene), poly(2,5-diisopropylstyrene), and poly(2,4,6-trimethylstyrene) or copolymers of any two or more of the foregoing.

One specific example of the second layer, in the case where the out-of-plane retardation ($R_{th}$) of the multilayer compensator is more positive than +20 nm, is presented below with the corresponding polymer and its structure.

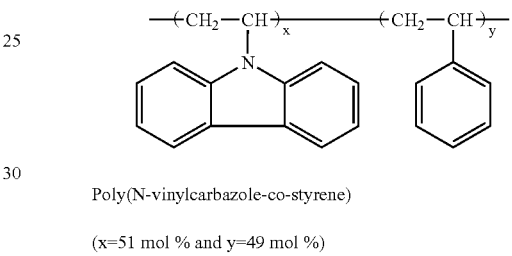

Poly(N-vinylcarbazole-co-styrene)

(x=51 mol % and y=49 mol %)

Table F below shows the effect of stretch ratio on $R_{in}$ and $R_{th}$ of a multilayer optical compensator comprising a layer of 7 μm of Poly (N-vinylcarbazole-co-styrene) as shown above where x=51 mol % and y=49 mol % [Coated from a 15% solids solution in toluene/methylene chloride] and a layer of 2 μm polyurethane [Sancure 898]/polyester [Eastek 1100] blend coated on 80 μm thick TAC. Poly(N-vinylcarbazole-co-styrene) where x=51 mol % and y=49 mol %, is a positively-birefringent material, i.e., a polymer capable of producing positive out-of-plane birefringence. The retardation is measured with an ellipsometer (model M2000V, J.A. Woollam Co.) at a wavelength of 590 nm.

It should be noted that while the in-plane retardations reported in these examples are listed as positive numbers, they are opposite in sign to the in-plane retardations produced by the negatively birefringent polymers listed in the previous examples (Examples 1-17). That is, the larger in-plane retardation in these examples is perpendicular to the direction of stretching. The Tg of this polymer is 147° C. as measured by differential scanning calorimetry (DSC). The multilayer films of these examples are prepared in an essentially identical manner as the films of Examples 1-17.

TABLE G

| Example | Stretch Temp. (° C.) | Rth (nm) | Rin (nm) |
|---|---|---|---|
| 19 | 135 | +40 | 22 |
| 20 | 135 | +45 | 35 |
| 21 | 135 | +55 | 45 |

From Table G it is seen that a positively-birefringent polymer contained in the second layer can produce positive out-of-plane retardation in a multilayer compensator, which is potentially useful in compensating IPS-mode LCDs. The corresponding out-of-plane birefringence of the second layers in the films of Table G ranges from +0.013 to +0.015.

Other positively-birefringent polymers can also be applied in a multilayer compensator for IPS-mode LCD's. Examples of such polymers are listed in Table H together with their corresponding glass transition temperatures. The Tg and birefringence of the polymers listed could be further varied by changing the relative compositions of the constituent comonomers.

TABLE H

| Copolymer (molar ratio of comonomers) | Structure | Tg (° C.) |
|---|---|---|
| Vinylcarbazole and styrene (51/49) | | 147 |
| Vinylcarbazole and dimethyl maleate (52/48) | | 160 |
| Vinylcarbazole and isobornyl methacrylate (22/78) | | 205 |
| Vinylcarbazole and isobornyl methacrylate (43/57) | | 196 |
| Vinylcarbazole and methyl methacrylate (52/48) | | 156 |
| Vinylcarbazole and methyl methaceylate and methacrylic acid (47/48/5) | | 163 |

TABLE H-continued

| Copolymer (molar ratio of comonomers) | Structure | Tg (° C.) |
|---|---|---|
| Acrylyl Carbazole | 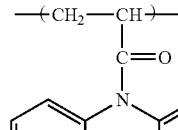 | 168 |
| Acrylyl carbazole and styrene (32/68) | 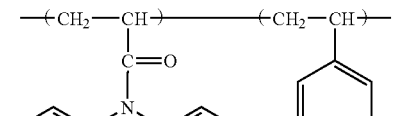 | 152 |
| Acrylyl carbazole and isobornyl methacrylate (50/50) | 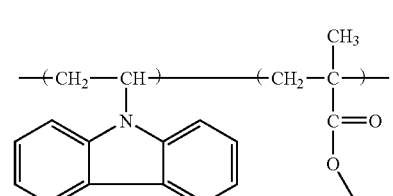 | 176 |

Other useful second comonomers could include, for example, acrylamide, acrylonitrile, vinyl pyrolidone, butyl acrylate and ethyl acrylate.

As should be obvious based on the preceding detailed description, a wide variety of multilayer optical compensation film composites having various types and arrangements of auxiliary layers may be prepared. Some of the possible configurations are illustrated by the following non-limiting examples.

Multilayer optical compensation film composite example C1:

| |
|---|
| Second layer |
| First layer (e.g., TAC) |
| Carrier substrate |

In one embodiment of the example C1 above, 100 micrometer thick polyethylene terephthalate carrier substrate is corona treated and then coated with a triacetyl cellulose (TAC) formulation. The dried TAC layer is 20 micrometers in thickness and contains 11 wt % triphenyl phosphate plasticizer, 1 wt % TINUVIN® 8515 UV absorber (a mixture of 2-(2'-Hydroxy -3'-tert-butyl-5'-methylphenyl)-5-chloro benzotriazole and 2-(2'-Hydroxy-3',5'-ditert-butylphenyl)-benzotriazole, available from Ciba Specialty Chemicals.) and about 0.1 wt % PARSOL® 1789 UV absorber (4-(1,1-dimethylethyl)-4'-methoxydibenzoylmethane, available from Roche Vitamins Inc.). Onto the TAC layer is applied a second layer, as described in detail above.

Multilayer optical compensation film composite example C2:

| |
|---|
| First layer (e.g., TAC) |
| Second layer |
| Carrier substrate |

Multilayer optical compensation film composite example C3:

| |
|---|
| Second layer |
| Second layer |
| First layer (e.g., TAC) |
| Carrier substrate |

Multilayer optical compensation film composite example C4:

| |
|---|
| Second layer |
| Contiguous first layer |
| First layer (e.g., TAC) |
| Carrier substrate |

Multilayer optical compensation film composite example C5:

| |
|---|
| Second layer |
| Second layer |
| Contiguous first layer |
| First layer (e.g., TAC) |
| Carrier substrate |

Multilayer optical compensation film composite example C6:

| |
|---|
| Second layer |
| Contiguous first layer |
| First layer (e.g., TAC) |
| Contiguous first layer |
| Second layer |
| Carrier substrate |

Multilayer optical compensation film composite example C7:

| |
|---|
| Second layer |
| Contiguous first layer |
| First layer (e.g., TAC) |
| Release layer |
| Primer layer |
| Carrier substrate |

Multilayer optical compensation film composite example C8:

| |
|---|
| Strippable, Protection layer |
| Second layer |
| Contiguous first layer |
| First layer (e.g., TAC) |
| Carrier substrate |

Multilayer optical compensation film composite example C9:

| |
|---|
| Strippable, Protection layer |
| Second layer |
| Contiguous first layer |
| First layer (e.g., TAC) |
| Antistatic layer |
| Carrier substrate |

Multilayer optical compensation film composite example C10:

| |
|---|
| Abrasion resistant layer |
| Second layer |
| First layer (e.g., TAC) |
| Carrier substrate |

Multilayer optical compensation film composite example C11:

| |
|---|
| Strippable, Protection layer |
| Second layer |
| Second layer |
| Contiguous first layer |
| First layer (e.g., TAC) |
| Release layer |
| Primer layer |
| Carrier substrate |

In some cases, the first layer may be omitted, and the second layer provided directly on the carrier substrate, as shown in multilayer optical compensation film composite example C12:

| |
|---|
| Strippable, Protection layer |
| Second layer |
| Carrier substrate |

Clearly, many configurations and arrangements other than the twelve examples described above are possible, and the scope of the invention is defined by the accompanying claims which encompass all of the structures recited therein and their equivalents.

Figure 12A:
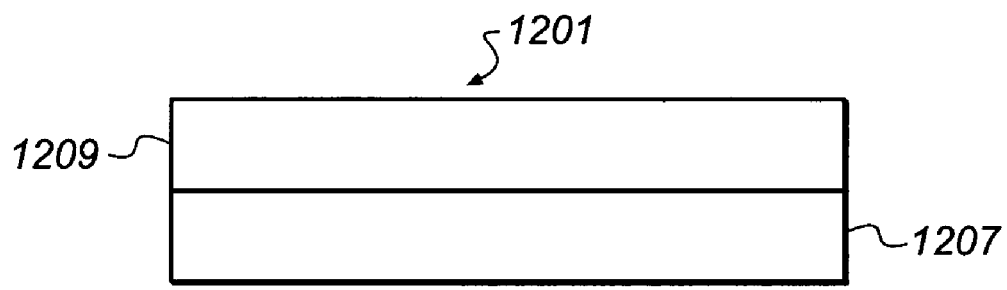
FIG. 12A, FIG. 12B and FIG. 12C are elevation schematics of one embodiment of a multilayer optical compensator.
Figure 12B:
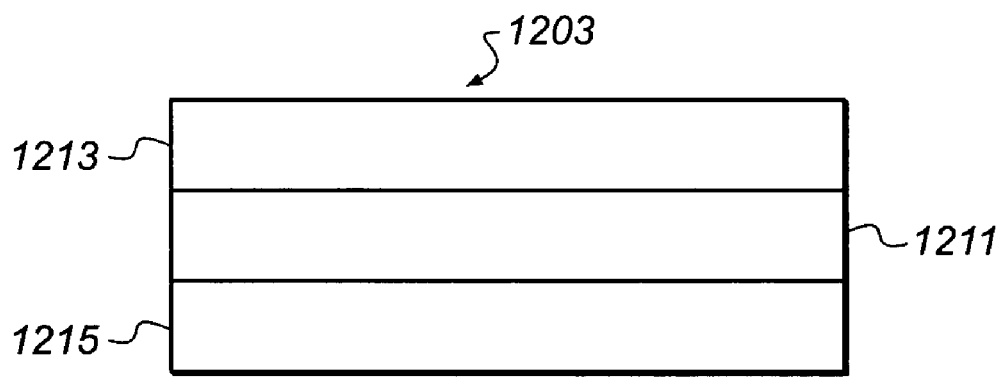
Figure 12C:
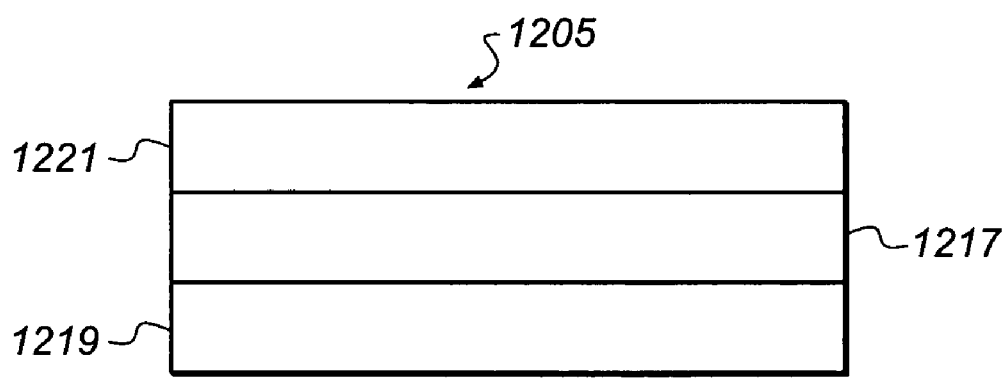

FIG. 12A, FIG. 12B and FIG. 12C are elevation schematics of the exemplary multilayer optical compensators which include one or more first (A) layers having an out-of-plane birefringence ($\Delta n_{th}$) not more negative than −0.005, or not more positive than +0.005, and one or more second (B) polymer layers having an out-of-plane birefringence more negative than −0.005 or more positive than +0.005. Compensator 1201 in FIG. 12A has a structure in which a B layer 1209 is disposed on an A layer 1207. The A layer 1207 and the B layer 1209 are contiguous. It is also possible to have two B layers 1213, 1215 disposed on one A layer 1211 such as the compensator 1203 in FIG. 12B. In other case 1205, one B layer 1217 is sandwiched by two A layers 1219, 1221. The compensator 1205 can be formed, for example, by laminating contiguous layers of A 1221 and B 1217, and the single layer of A 1219. The lamination is done at the interface of B layer 1217 and A layer 1219, and the two layers 1217 and 1219 may or may not be contiguous depending on the method of the lamination. One skilled in the art could conceive of more complex structures.

Figure 13A:
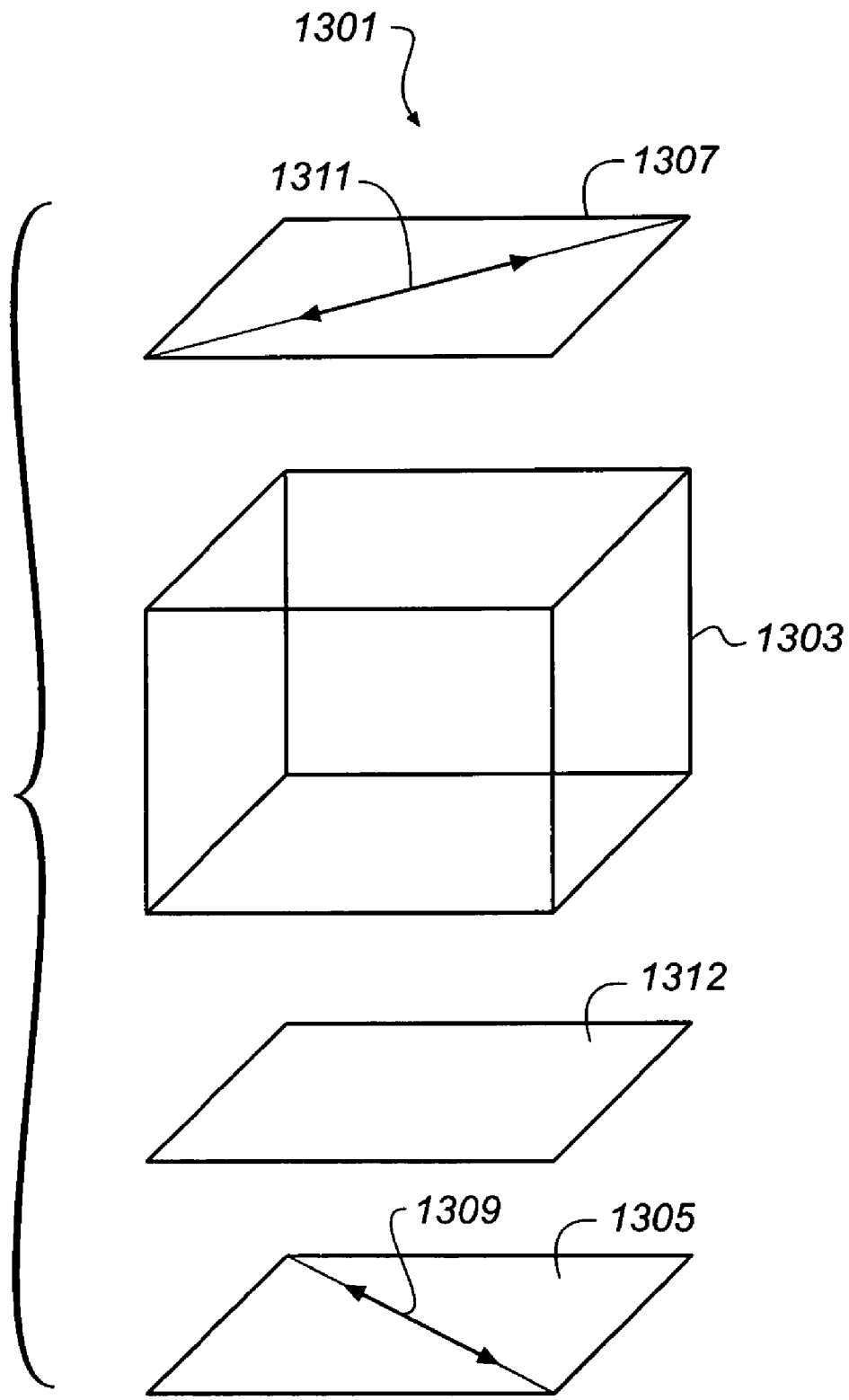
FIG. 13A, FIG. 13B and FIG. 13C are schematics of a liquid crystal display with multilayer optical compensators as described herein.
Figure 13B:
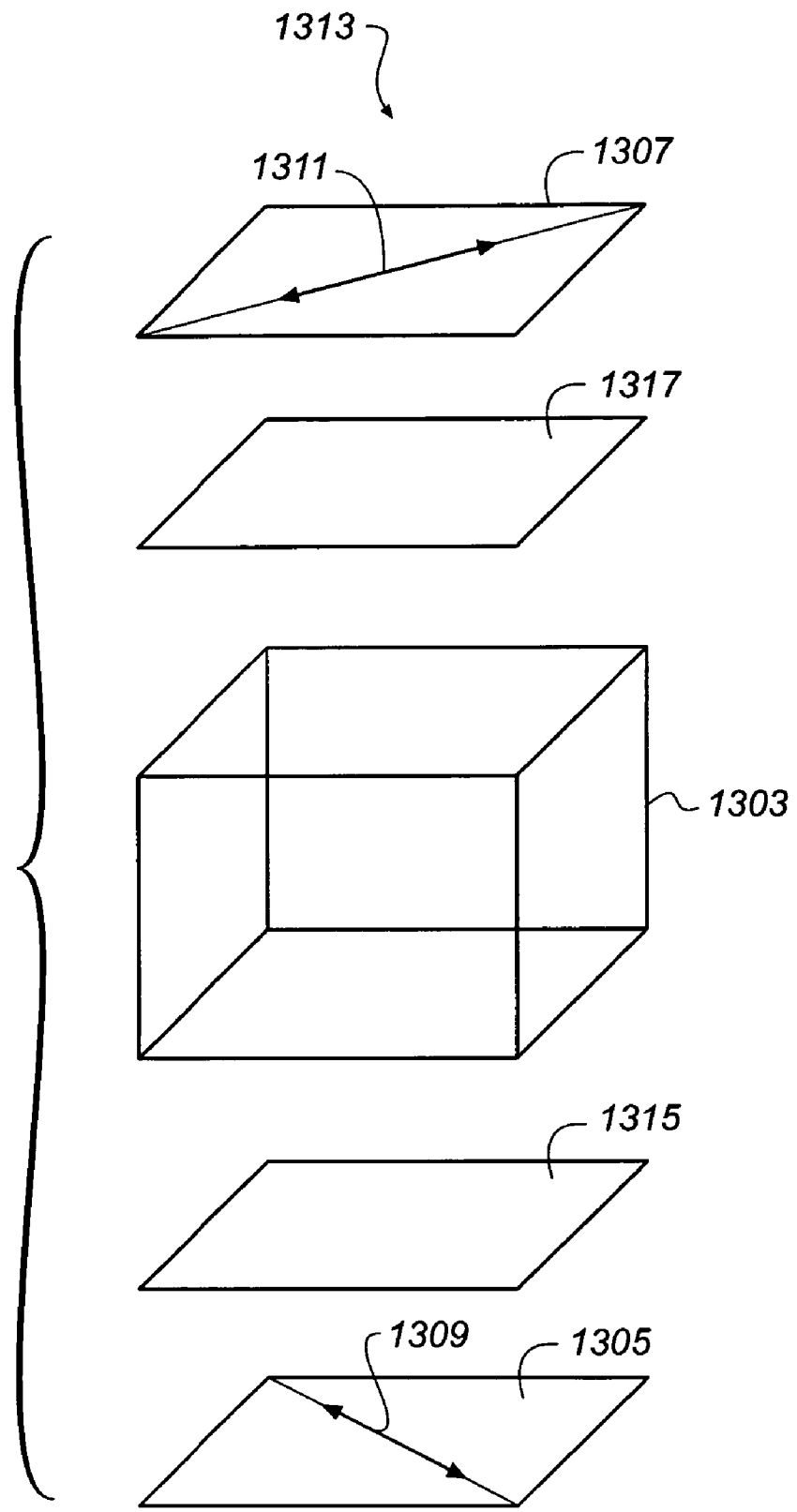
Figure 13C:
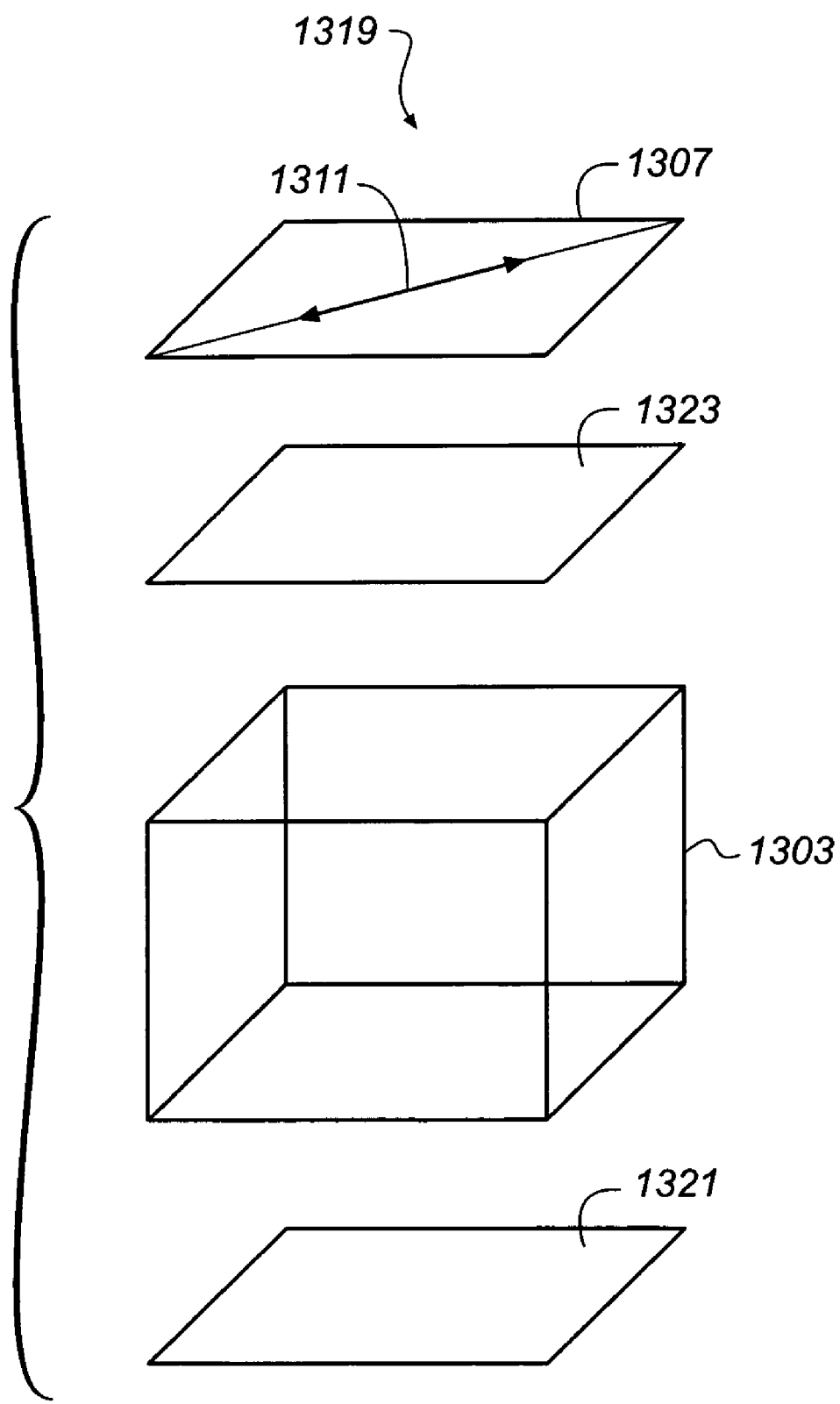

In LCD 1301 shown in FIG. 13A, the liquid crystal cell 1303 is placed between the polarizer 1305 and analyzer 1307. Transmission axis 1309 of the polarizer 1305 and the transmission axis 1311 of analyzer 1307 extend at an angle of 90±10° relative to each other, and thus, the polarizer 1305 and analyzer 1307 are said to be "crossed polarized". A multilayer optical compensator 1312 is placed between the polarizer 1305 and the liquid crystal cell 1303. It can also be placed between the liquid crystal cell 1303 and the analyzer 1307. LCD 1313 shown schematically in FIG. 13B has two multilayer optical compensators 1315, 1317 placed on both sides of the liquid crystal cell 1303. FIG. 13C shows an application example of multilayer optical compensator in a reflective type LCD 1319. The liquid crystal cell 1303 is located between the polarizer 1305 and a reflective plate 1321. In the figure, reference number 1309 is the transmission axis of the polarizer 1305. As shown, in this example, the multilayer compensator 1323 is placed between the liquid crystal cell 1303 and the polarizer 1305. However, it can also be placed between the reflective plate 1321 and the liquid crystal cell 1303.

Compared to the prior art, embodiments disclosed above avoid retardation increasing agents that could cause undesired coloration or could diffuse out of the compensator causing retardation loss and/or unwanted chemistry, do not require the use of liquid crystal compounds and its alignment procedure, provide enhanced optical compensation in a relatively thin (<60 μm) structure, and are easily manufactured. The invention has been described in detail with particular reference to certain preferred embodiments thereof, but it will be understood that variations and modifications can be effected within the scope of the invention.

PARTS LIST 10 drying system
12 moving substrate/web
14 dryer
16 coating apparatus
18 unwinding station
20 back-up roller
22 coated web
24 cover sheet composite
26 wind up station
28 coating supply vessel
30 coating supply vessel
32 coating supply vessel
34 coating supply vessel
36 pumps
38 pumps
40 pumps
42 pumps
44 conduits
46 conduits
48 conduits
50 conduits
52 discharge device
54 polar charge assist device
56 opposing rollers
58 opposing rollers
60 preformed protection layer
62 winding station
64 winding station
66 drying section
68 drying section
70 drying section
72 drying section
74 drying section
76 drying section
78 drying section
80 drying section
82 drying section
92 front section
94 second section
96 third section
98 fourth section
100 back plate
102 inlet
104 metering slot
106 pump
108 lower most layer
110 inlet
112 2nd metering slot
114 pump
116 layer
118 inlet
120 metering slot
122 pump
124 form layer
126 inlet
128 metering slot
130 pump
132 layer
134 incline slide surface
136 coating lip
138 2nd incline slide surface
140 3rd incline slide surface
142 4th incline slide surface
144 back land surface
146 coating bead
151 multilayer optical compensation film composite
153 multilayer optical compensation film composite
155 multilayer optical compensation film composite
157 multilayer optical compensation film composite
159 multilayer optical compensation film composite
162 first layer
164 contiguous first layer
166 second layer
167 pressure sensitive layer
168 second layer
169 preformed protection layer
170 carrier substrate
171 multilayer optical compensation film
173 multilayer optical compensation film
174 first layer
175 multilayer optical compensation film
176 intermediate layer
177 multilayer optical compensation film
178 intermediate layer
179 multilayer optical compensation film
180 PVA adhesion layer
184 release layer
662 second layer
664 contiguous first layer
665 first layer
666 contiguous first layer
668 second layer
669 strippable protection layer
901 film
903 plane of the film
1001 VA liquid crystal cell in OFF state
1003 VA liquid crystal cell in ON state
1005 liquid crystal optic axis
1007 liquid crystal cell substrate
1009 light propagating cell normal direction
1011 light propagating oblique direction
1101 OCB liquid crystal cell in OFF state
1103 OCB liquid crystal cell in ON state
1105 liquid crystal optic axis
1107 cell middle plane
1109 cell boundaries
1201 multilayer optical compensator
1203 multilayer optical compensator
1205 multilayer optical compensator
1207 A layer
1209 B layer
1211 A layer
1213 B layer
1215 B layer
1217 B layer
1219 A layer
1221 A layer
1301 LCD
1303 liquid crystal cell
1305 polarizer
1307 analyzer
1309 transmission axis of polarizer
1311 transmission axis of analyzer
1312 multilayer optical compensator
1313 LCD
1315 multilayer optical compensator
1317 multilayer optical compensator
1319 LCD
1321 reflective plate
1323 multilayer optical compensator
1400 feed line
1402 extrusion hopper 1404 pressurized tank
1406 pump
1408 metal drum
1410 drying section
1412 drying oven
1414 cast film
1416 final drying section
1418 final dried film
1420 wind-up station
nx index of refraction in x direction
ny index of refraction in y direction
nz index of refraction in z direction
$\Delta n_{th}$ out-of-plane birefringence
$\Delta n_{in}$ in-plane birefringence
d thickness of the layer or film
$R_{th}$ out-of-plane retardation
$R_{in}$ in-plane retardation
$\lambda$ wavelength
$T_g$ glass transition temperature

The invention claimed is:

1. A method of forming a multilayer optical compensation film, comprising:
coating one or more first layers and one or more second layers onto a carrier substrate; and
stretching the first layers and second layers simultaneously,
wherein one or more first layers include a polymer having an out-of-plane birefringence ($\Delta n_{th}$) not more negative than −0.005 and not more positive than +0.005;
wherein the one or more second layers include a polymer having an out-of-plane birefringence more negative than −0.005 or more positive than +0.005; and
wherein the overall in-plane retardation ($R_{in}$) of the multilayer optical compensation film is greater than 20 nm and the out-of-plane retardation ($R_{th}$) of the multilayer optical compensation film is more negative than −20 nm or more positive than +20 nm.

2. The method of claim 1, wherein stretching the first layers and second layers simultaneously is done with a tenter frame, wherein the first and second layers are held at edges thereof by a flexible clamping assembly that forces the first layers and second layers to expand widthwise to induce orientation along the transverse direction.

3. The method of claim 1, wherein stretching the first layers and second layers simultaneously includes passing the first layers and second layers through two adjacent rolls rotating at different linear speeds, with edges of the first layers and second layers being either free or constrained, to induce orientation along a machine direction.

4. The method of claim 1, wherein the first and second layers are stretched along the machine direction and a transverse direction, simultaneously or sequentially.

5. The method of claim 1, wherein the stretching includes restraining at least two sides of the multi-layered film, and drying the first and second layers by application of heat to the first and second layers.

6. The method of claim 1, further comprising drying the first and second layers prior to application of heat and then stretching the first and second layers.

7. The method of claim 1, wherein the out-of-plane retardation ($R_{th}$) of the multilayer optical compensation film is more negative than −20 nm.

8. The method of claim 7, wherein the polymer of the one or more second layers includes in the backbone a non-visible chromophore group.

9. The method of claim 8, wherein the polymer of the one or more second layers comprises pendant cycloaliphatic groups.

10. The method of claim 9, wherein the cycloaliphatic groups are at least one selected from the group of cyclopentane, cyclohexane, norbornene, hexahydro-4,7-methanoindan-r-ylidene, adamantane, and any of the foregoing having fluorine substitution for at least one hydrogen atom.

11. The method of claim 7, wherein the amorphous polymer of the one or more second layers contains in the backbone a nonvisible chromophore including a vinyl, carbonyl, amide, imide, ester, carbonate, aromatic, sulfone, phenyl, naphthyl, biphenyl, bisphenol, or thiophene or azo group.

12. The method of claim 7, wherein at least one first layer includes a cellulosic, acrylic, or olefinic polymer, or a polyarylate containing fluorene groups.

13. The method of claim 1, wherein the out-of-plane retardation ($R_{th}$) of the multilayer optical compensation film is more positive than +20 nm.

14. The method of claim 13, wherein the polymer of the one or more second layers contains off the backbone a non-visible chromophore group.

15. The method of claim 14, wherein the polymer of the one or more second layers comprises off the backbone a vinyl, carbonyl, amide, imide, ester, carbonate, aromatic, sulfone, azo, phenyl, naphthyl, biphenyl, bisphenol, or thiophene group.

16. The method of claim 14, wherein the non-visible chromophore group includes a carbonyl, amide, imide, ester, carbonate, phenyl, naphthyl, biphenyl, bisphenol, or thiophene group.

17. The method of claim 14, wherein the non-visible chromophore group includes a heterocyclic or carbocyclic aromatic group.

18. The method of claim 14, wherein the amorphous polymer of the one or more second layers comprises a non-visible chromophore pendant to the backbone.

19. The method of claim 18 wherein at least one first layer includes a cellulosic, acrylic, or olefinic polymer, or polyarylate containing flourene groups.

20. The method of claim 13, wherein at least one second layer comprises a copolymer including N-vinylcarbazole.

21. The method of claim 1, wherein the polymer of the one or more second layers is an amorphous polymer.

22. The method of claim 1, further comprising forming an abrasion resistant layer on the same side of the carrier substrate as the multilayer optical compensation film.

23. The method of claim 1, further comprising forming an antistatic layer on the same side of the carrier substrate as the multilayer optical compensation film.

24. The method of claim 1, further comprising forming a strippable protection layer on the opposite surface of the multilayer optical compensation film from the carrier substrate.

25. The method of claim 1, further comprising forming a release layer between the carrier substrate and the multilayer optical compensation film.

26. The method of claim 1, wherein the carrier substrate comprises polyethylene terephthalate.

27. The method of claim 1, further comprising forming a layer promoting adhesion to polyvinyl alcohol on the same side of the carrier substrate as the multilayer optical compensation film.

28. The method of claim 1, wherein the carrier substrate is stretched together with the first and second layers.

29. The method of claim 1, further comprising detaching the first and second layers from the carrier substrate.

30. The method of claim 29, wherein the first and second layers are stretched after detachment from the carrier substrate.

31. The method of claim 1, where the one or more second layers are disposed between the carrier substrate and the one or more first layers.

32. The method of claim 1, where the one or more first layers are disposed between the earner substrate and the one or more second layers.

33. A method of forming an optical compensation film, comprising: coating one or more polymeric layers onto a carrier substrate; and
stretching the one or more polymeric layers simultaneously,
wherein the one or more polymeric layers include a polymer having an out-of-plane birefringence more negative than −0.005 or more positive than ±0.005; and
wherein the overall in-plane retardation ($R_{in}$) of the one or more polymeric layers is greater than 20 nm and the out-of-plane retardation ($R_{th}$) of the one or more polymeric layers is more negative than −20 nm or more positive than +20 nm.

34. The method of claim 1, where a viscosity of the coating liquid is less than 2000 cp.

* * * * *